US012409102B2

(12) United States Patent
Ehrstedt et al.

(10) Patent No.: US 12,409,102 B2
(45) Date of Patent: Sep. 9, 2025

(54) ADJUSTABLE BACK PLATE FOR MECHANICAL COMPRESSION DEVICE

(71) Applicant: Physio-Control, Inc., Redmond, WA (US)

(72) Inventors: Marcus Ehrstedt, Kävlinge (SE); Thomas Falk, Staffenstorp (SE); Anders Nilsson, Akarp (SE); Tyson Taylor, Bothell, WA (US); David Linville, Woodinville, WA (US); Eric Sandrup, Lund (SE); Jonas Lagerstrom, Fagersanna (SE); Anders Jeppsson, Lund (SE); Sara Lindroth, Lund (SE); Fredrik Arnwald, Lomma (SE)

(73) Assignee: PHYSIO-CONTROL, INC., Redmond, WA (US)

( * ) Notice: Subject to any disclaimer, the term of this patent is extended or adjusted under 35 U.S.C. 154(b) by 982 days.

(21) Appl. No.: 17/513,067

(22) Filed: Oct. 28, 2021

(65) Prior Publication Data

US 2022/0133587 A1 May 5, 2022

Related U.S. Application Data

(60) Provisional application No. 63/158,800, filed on Mar. 9, 2021, provisional application No. 63/107,184, filed on Oct. 29, 2020.

(51) Int. Cl.
*A61H 31/00* (2006.01)

(52) U.S. Cl.
CPC ......... *A61H 31/004* (2013.01); *A61H 31/008* (2013.01); *A61H 31/006* (2013.01);
(Continued)

(58) Field of Classification Search
CPC ................ A61H 31/004; A61H 31/006; A61H 2201/0192; A61H 2201/1607; A61H 2201/1626; A61H 31/008
See application file for complete search history.

(56) References Cited

U.S. PATENT DOCUMENTS 3,985,126 A * 10/1976 Barkalow ............ A61H 31/008 601/106
9,016,283 B2 4/2015 Paulussen et al.
(Continued)

FOREIGN PATENT DOCUMENTS

CN 101612090 A 12/2009
CN 103040602 A 4/2013
(Continued)

OTHER PUBLICATIONS

Qvigstad et al., "Clinical pilot study of different hand positions during manual chest compressions monitored with capnography," Resuscitation, vol. 84, No. 9, 2013, pp. 1203-1207.
(Continued)

*Primary Examiner* — Victoria Murphy
*Assistant Examiner* — Sara K Toich
(74) *Attorney, Agent, or Firm* — Miller Nash LLP

(57) ABSTRACT

Examples of the disclosure are directed to adjustable back plates or backboards for a mechanical compression device to accommodate different patient sizes and/or for ease of storage. Examples of the disclosure includes back plates that can be folded, pieced together, or otherwise have a variable distance between connectors that attach to legs of a chest compression device. Examples also include back plates which may have two sides, such as an adult patient side and a pediatric patient side, to accommodate different patient sizes.

13 Claims, 24 Drawing Sheets

(52) U.S. Cl.
CPC ................ *A61H 2201/0192* (2013.01); *A61H 2201/1607* (2013.01); *A61H 2201/1626* (2013.01)

(56) References Cited

U.S. PATENT DOCUMENTS

| | | | | |
|---|---|---|---|---|
| 9,539,173 | B2 | 1/2017 | Jeppsson | |
| 9,603,772 | B2 | 3/2017 | Jeppsson | |
| 9,775,771 | B2 | 10/2017 | Stemple et al. | |
| 10,702,449 | B2 | 7/2020 | Chapman et al. | |
| 2003/0127103 | A1 * | 7/2003 | Brenneman | A61G 1/04 128/845 |
| 2005/0080362 | A1 * | 4/2005 | Quintana | A61H 31/005 601/44 |
| 2010/0063425 | A1 | 3/2010 | King et al. | |
| 2016/0128899 | A1 * | 5/2016 | Lurie | A61G 13/1215 601/41 |
| 2016/0242996 | A1 * | 8/2016 | von Schenck | A61H 31/006 |
| 2017/0325091 | A1 * | 11/2017 | Freeman | H04W 12/069 |
| 2017/0348190 | A1 * | 12/2017 | Ehrstedt | A61H 31/006 |
| 2019/0008720 | A1 * | 1/2019 | Joshi | A61G 7/015 |
| 2019/0117498 | A1 | 4/2019 | Schenck et al. | |

FOREIGN PATENT DOCUMENTS

| | | | |
|---|---|---|---|
| CN | 110731892 | A | 1/2020 |
| EP | 1913924 | A1 | 4/2008 |

OTHER PUBLICATIONS

Extended European Search Report issued in European Patent Application No. 21205640.2, dated Mar. 28, 2022.
Extended European Search Report issued in European Patent Application No. 25162310.4, mailed May 14, 2025, 13 pages.

* cited by examiner

ADJUSTABLE BACK PLATE FOR MECHANICAL COMPRESSION DEVICE

CROSS-REFERENCES TO RELATED APPLICATIONS

This patent application claims the benefit of U.S. provisional application No. 63/158,800 filed Mar. 9, 2021. This patent application also claims the benefit of U.S. provisional application No. 63/107,184 filed Oct. 29, 2020. Application Nos. 63/158,800 and 63/107,184 are each incorporated into the present disclosure by this reference.

TECHNICAL FIELD

This disclosure is directed to systems and methods related to mechanical cardiopulmonary resuscitation (CPR) devices, and in particular, to adjustable back plates or backboards that support a patient and accommodate a variety of patient sizes.

BACKGROUND

Mechanical compression devices for CPR are being increasingly adopted by emergency medical services around the world. Patients, however, come in a wide variety of sizes and many mechanical compression devices are designed to only accommodate patients of a certain size. However, some patients have a body habitus that falls outside the acceptable range for the device's specifications and therefore can be excluded from receiving the benefits of mechanical CPR. For example, patients that are smaller or pediatric, as well as larger patients, may not fit within the acceptable range for the device's specifications.

Some clinicians have developed ad-hoc solutions, especially for pediatric patients. For example, sometimes clinicians will place a towel underneath a pediatric patient and/or configure the piston of the CPR device to start compression one to two centimeters above the sternum of the patient. Such ad-hoc approaches can lead to significant injury to the patient if not performed correctly. For example, if a compression depth is not controlled correctly, it can lead to rupture of the heart or other organs.

Given the growing evidence of benefits of using mechanical compressions, especially in longer duration resuscitations, and the risk of either not being able to perform the compressions or doing so using ad-hoc approaches, a solution is needed for delivering precise, consistent, predictable, and safe mechanical compression for smaller patients and larger patients that do not fit within the acceptable body size for current mechanical devices.

Configurations of the disclosed technology address shortcomings in the prior art.

BRIEF DESCRIPTION OF THE DRAWINGS

Aspects, features and advantages of examples of the present disclosure will become apparent from the following description of examples in reference to the appended drawings in which:

FIGS. 41A-41C illustrate the lateral sections of the supportive structure in three different positions.

DETAILED DESCRIPTION

Examples of the disclosure are directed to adjustable back plates or backboards for a mechanical compression device to accommodate different patient sizes or for ease of storage. As will be discussed in more detail below, examples of the disclosure includes back plates that can be folded, pieced together, or otherwise have a variable distance between connectors that attach to the legs of the chest compression device. Examples also include back plates which may have two sides to accommodate different patient sizes.

Figure 1:
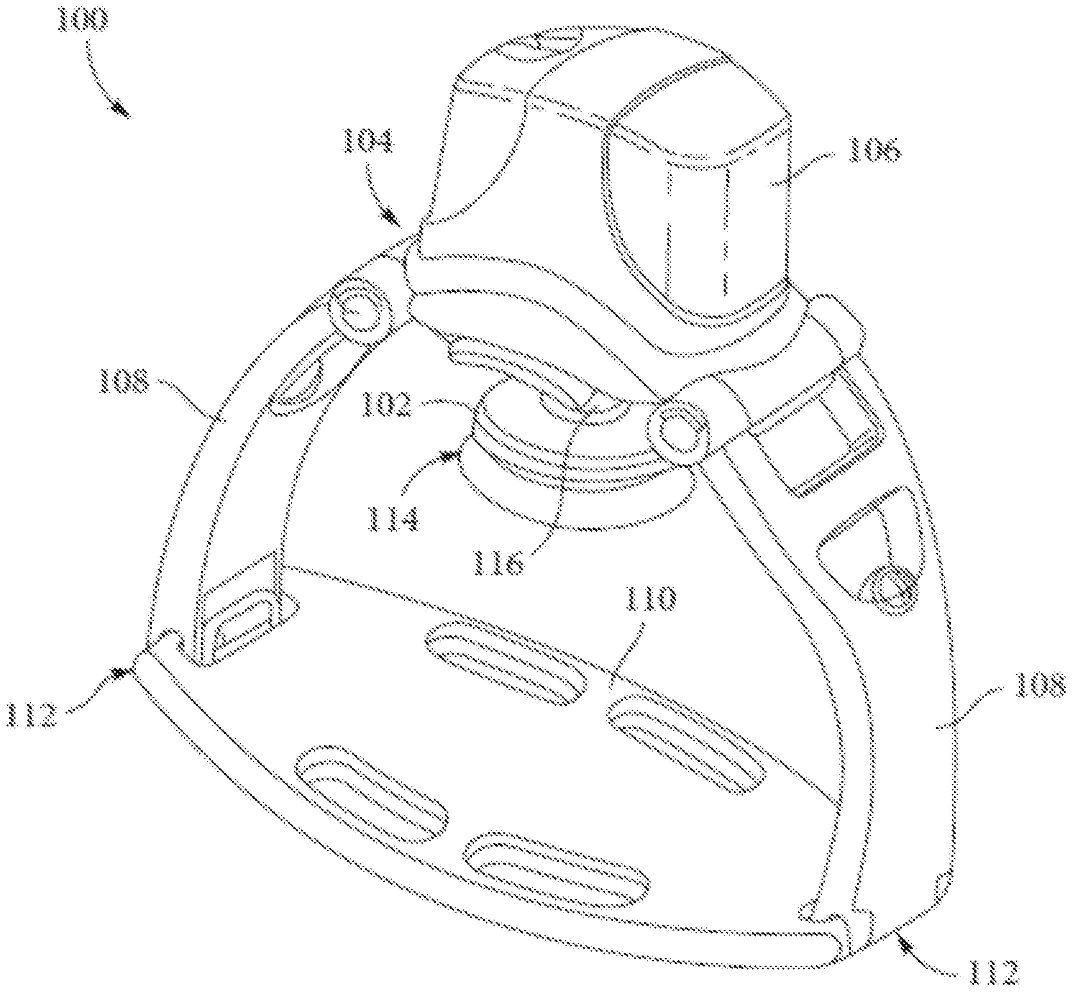
FIG. 1 is a perspective view of an example mechanical compression device.

FIG. 1 is a front view of an example CPR device 100 of FIG. 1. While FIG. 1 is described to illustrate a mechanical compression device, examples of the disclosure are not limited to this particular type of compression device, but may be used with any compression device.

As will be understood by one skilled in the art, the mechanical CPR device 100 may include additional components not shown in FIG. 1. As illustrated in FIG. 1, a CPR device 100 may include a support structure 104 and a central unit 106. The support structure 104 may include a support legs 108 and a base member 110. The support legs 108 and the base member 110 each meet at a junction 112 between the support leg 108 and the base member 110.

The support legs 108 may be configured to support central unit 106 at a distance from the base member 110. For example, if the base member 110 is underneath the patient, who is lying on the patient's back, then the support leg 108 may support the central unit 106 at a sufficient distance over the base member 110 to allow the patient to lay within a space between the base member 110 and the chest compression mechanism 114, while positioning the chest compression mechanism 114 over the patient's chest. The base member, or back plate, 110 may be configured to be placed underneath the patient, for example when the patient is lying on the patient's back.

The central unit 106 may be configured to deliver CPR chest compressions to the patient. The central 106 may include, for example, a motor-driven piston 116 configured to contact the patient's chest through the suction cup 102 to provide the CPR compressions. The central unit 106 may also include a number of electronic components to drive the motor-driven piston 116. Attached the motor-driven piston 116 is a suction cup 102 which adheres to the chest of the patient during chest compressions. The suction cup 102 can allow the motor-driven piston 116 to lift the chest back to a resting height, or provide a full decompression of the chest of the patient, when the motor-driven piston 116 is retracted from an extended position.

Figure 2:
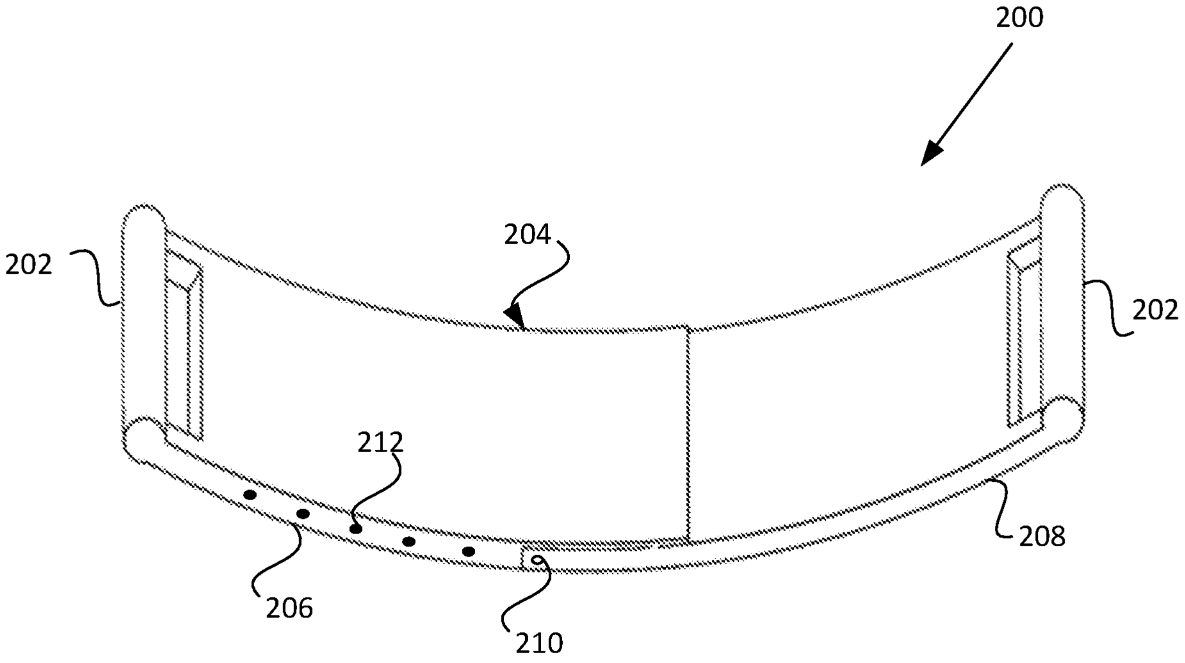
FIG. 2 is a perspective view of a telescoping back plate according to some examples of the disclosure.
Figure 3:
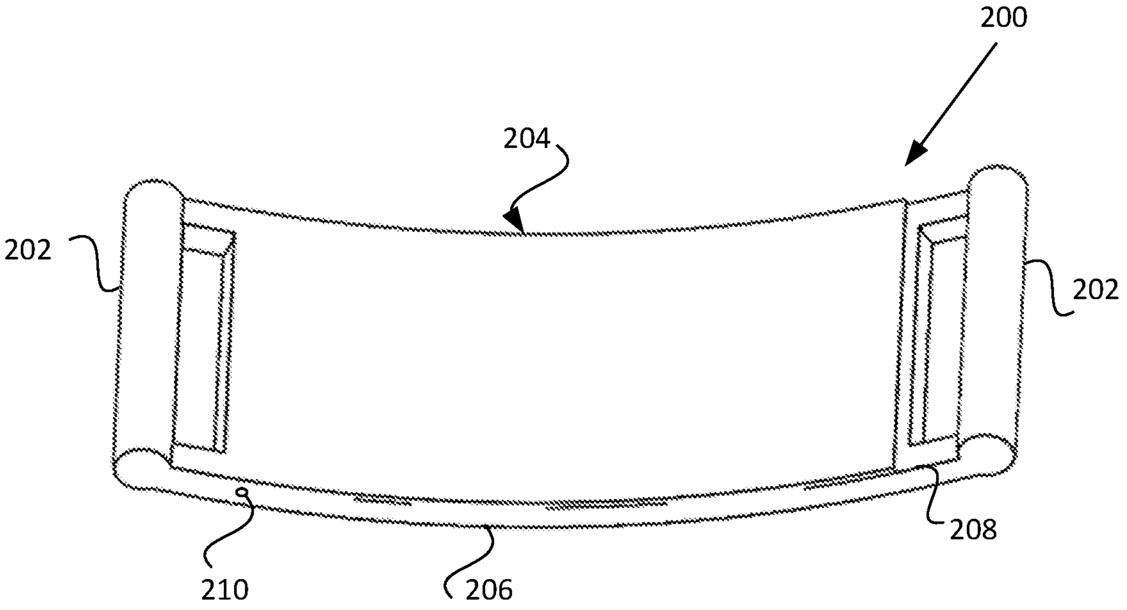
FIG. 3 is a perspective view of the telescoping back plate in FIG. 2 at its smallest size.

FIGS. 2 and 3 illustrate a back plate 200 according to some examples of the disclosure. Back plate 200 may be used instead of base member 110 discussed above to provide an adjustable back plate to accommodate different patient sizes. The back plate 200 includes two connection rails, or connectors, 202 which are structured to attach to a leg of the mechanical compression device. For example, the leg of the mechanical compression device may have a claw-like attachment member which can attach to connector 202. Other connection mechanisms may be utilized and examples of the disclosure are not limited to rail connectors. For example, the connectors 202 may slide into a receptacle in the leg of the compression device to attach the leg to the back plate 200. The connector 202 may form part of a handle for carrying the backboard 200.

The back plate 200 includes an adjustable elongated portion 204 that extends along an axis between the first connector 202 and the second connector 202. The elongated portion 204 may be telescoping and include a first portion 206 that is structured to receive or slide relative to a second portion 208. That is, the second portion 208 can slide within a compartment of the first portion 206. Although not shown, in some example, multiple portions 206 may be provided that can slide within compartments of each other. For example, a middle portion may slide within compartments of two outside portions. That is, the outside portions can either abut each other, or may be extended such that middle portion is exposed to laterally extend the backboard 200.

A number of different stops may be provided within the first portion 206 to select a size for the back plate 200. For example, a rescuer may release a clamp 210 which can allow the second portion 208 to slide in or out of the first portion 206. The rescuer may re-engage the clamp to set the length of the back plate 200 in one or more slots 212. The clamp, for example, may engage with a slot 212 or other type of recess to lock the second portion 208 relative to the first portion 206. Other locking mechanisms may be used as well and examples of the disclosure are not limited to a clamp style locking mechanism.

FIG. 2 illustrates the back plate 200 in the most extended position, while FIG. 3 illustrates the back plate 200 in a contracted position. The back plate 200 can be expanded or contracted between any of the two positions, such that the elongated portion 204 has a variable distance between the connectors 202.

Figure 4:
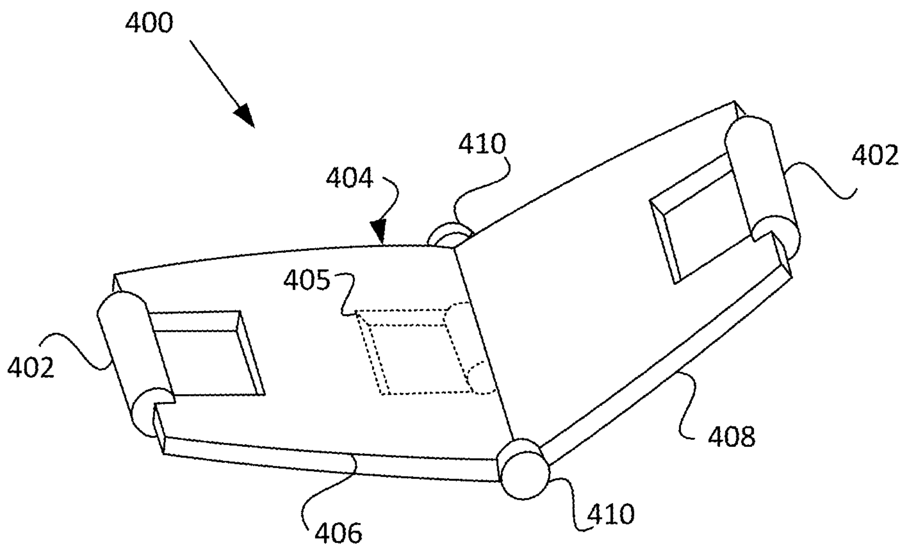
FIG. 4 is a perspective view of an example folding back plate according to some examples of the disclosure.
Figure 5:
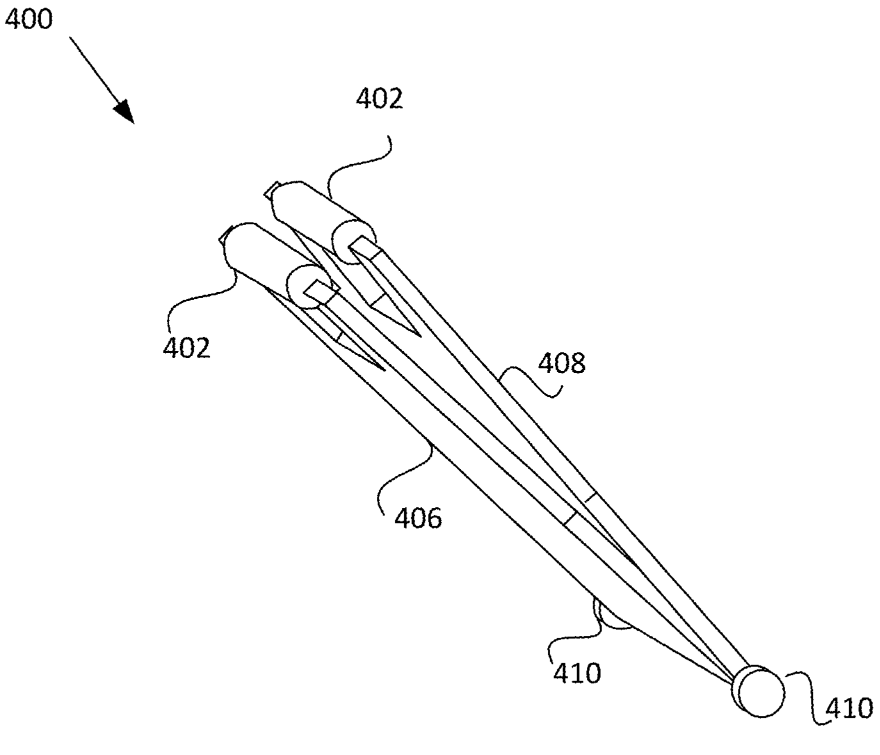
FIG. 5 is a perspective view of the folding back plate of FIG. 4 in a folded orientation.

FIGS. 4 and 5 illustrate an example of a back plate 400 which may be folded to save space during transportation. The back plate 400 can include two connectors 402, similar to connectors 202 discussed above. Connectors 402 are not limited to rails, but may be any type of connection mechanism that can engage with a leg of a mechanical compression device. The connector 402 may form part of a handle for carrying the backboard 400.

The back plate 400 includes an elongated portion 404 that extends between the connectors 402. The elongated portion 404 includes two segments 406 and 408. The two sections 406 and 408 are connected by one or more hinges 410. The hinges 410 allow the elongated portion 404 to be folded so that one of the segments of 406 or 408 is on top of the other segment 406 or 408.

In some examples, an optional connector 405 may be added to either one of segments 406 and 408. In FIG. 4, the optional connector 405 is shown as part of segment 406 located near the hinge 410. The optional connector 405 can allow the backboard to be utilized with the mechanical compression device when folded.

FIG. 5 illustrates the back plate 400 in a folded configuration, which can allow for easier storage during transportation and the back plate 400 takes up less physical space during transportation.

Examples of the disclosure are not limited to a back plate with two segments. As illustrates in FIGS. 6 and 7, a back plate 600 can include a number of different segments. Although four segments are shown in this example, three segments or more than four segments could be included in the back plate 600 to offer variety in the sizes the back plate 600 may be folded into. The back plate 600 includes connectors 602 similar to connectors 202 and 402 above. The connector 602 may form part of a handle for carrying the backboard 600.

An elongated portion 604 of back plate 600 is composed of four segments 606, 608, 610, and 612, in this example. Segments 606 and 612 extend from the connectors 602, and segment 606 is attached to segment 608 by one or more hinges 614. Segment 608 is also connected to segment 610, which is then connected to segment 612, each by hinges 614.

The back plate 600 may be foldable in different configurations for use with different sized patients. For example, in one configuration, segment 610 can be folded via the hinge 614 to be on top of segment 608, while segment 612 is folded over segment 610. That is, this configuration would result in an elongated portion 604 which is two segments wide, segments 608 and 612 to accommodate a smaller patient. To accommodate a larger patient, the back plate 600 is unfolded in its entirety to be four segments wide.

Figure 6:
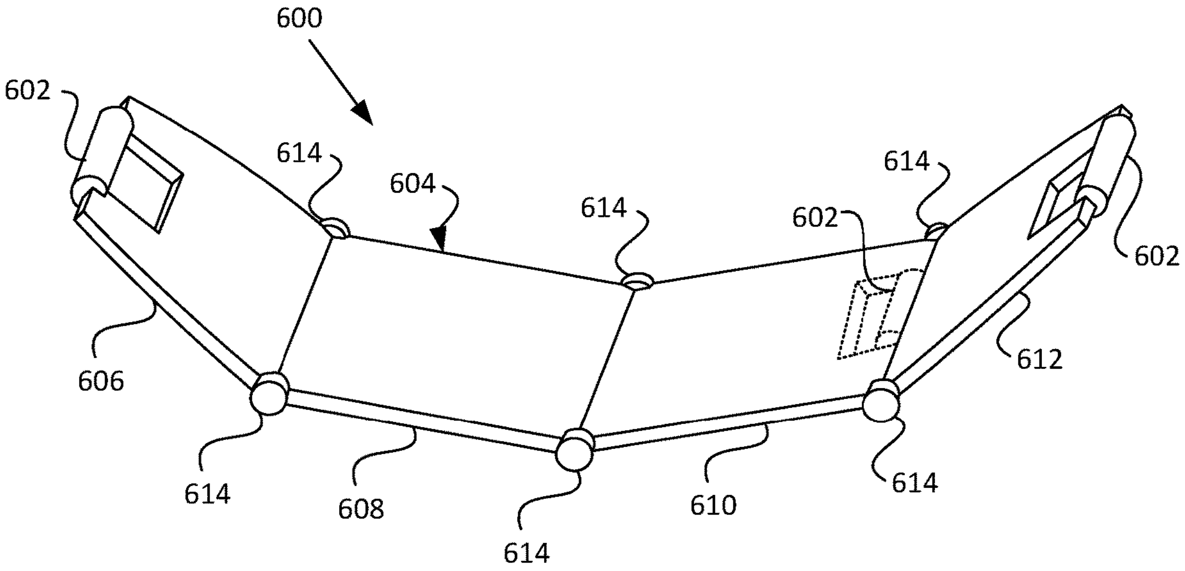
FIG. 6 is a perspective view of another example folding back plate according to some examples of the disclosure.
Figure 7:
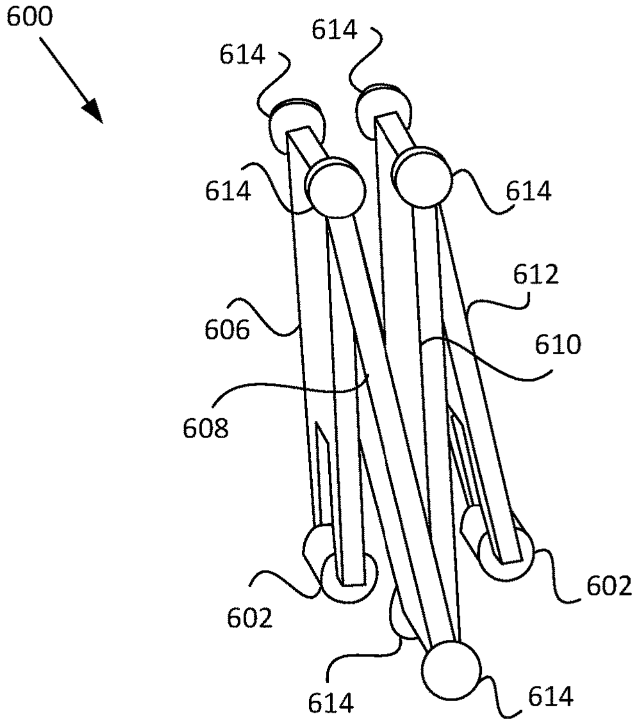
FIG. 7 is a perspective view of the folding back plate of FIG. 6 in a folded orientation.

Either or both of segments 608 and 610 may also include a connector 602 on an edge to allow for a three segment wide back plate 600. FIG. 6, for example illustrates an optional connector 602 as part of segment 610 along the edge of segment 610 that attaches via the hinge 614 to segment 612. Segment 612 can be folded by the hinge 614 to be under the segment 610 and a leg of the mechanical compression device can attach both to the connector 602 attached to segment 606 and the connector 602 attached to segment 610 to provide a backboard that is three segments wide. If five or more segments are provided, the back plate 600 may be folded to be in any number of different widths suitable for patients of different sizes, especially when each segment includes a connector 602.

Although hinges are illustrated above with respect to backboards 600 and 800, any type of joint may connect the various segments of the backboard together, either permanently or releaseably. If permanent, the joint allows the segments to pivot or rotate about the joint to fold the back plate in different configurations and sizes.

Figure 8:
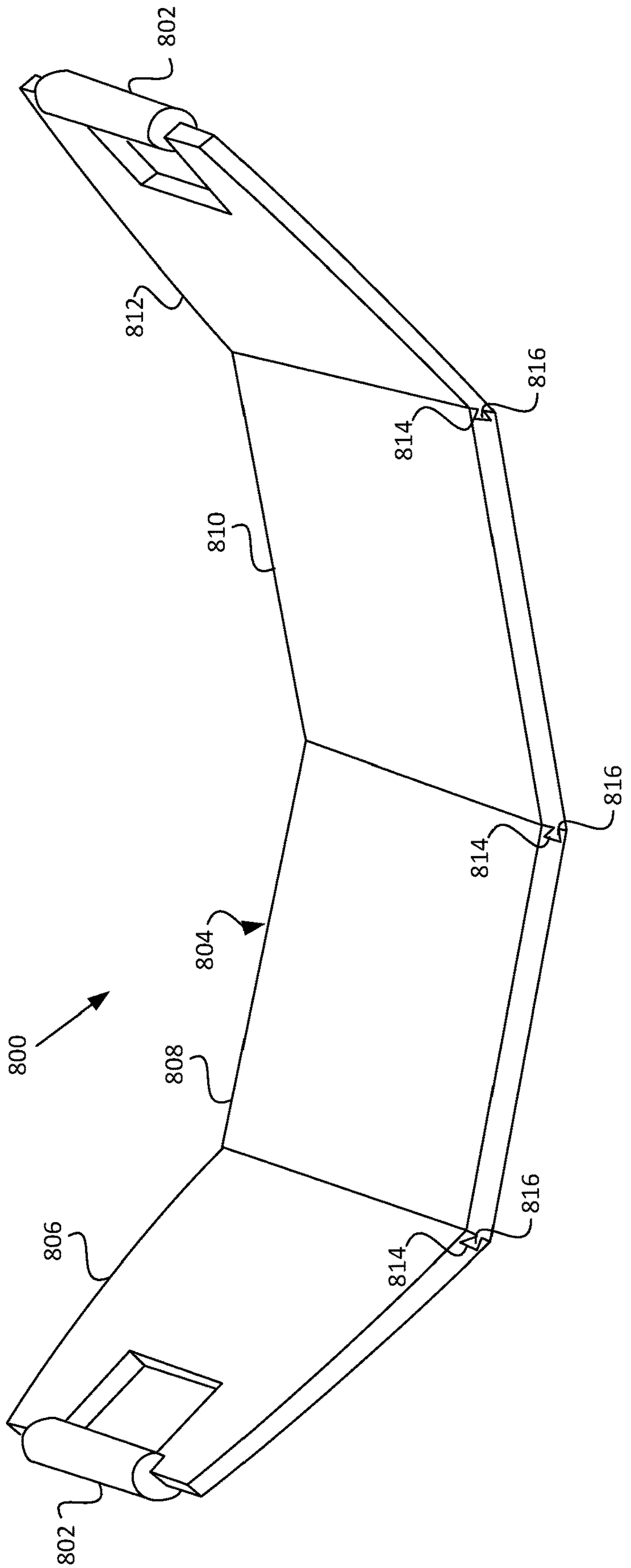
FIG. 8 is a perspective view of a back plate that can be taken apart according to some examples of the disclosure.

FIG. 8 illustrates another example of a back plate 800, which can include connectors 802 similar to connectors 202, 402, and 602 discussed above. The connector 802 may form part of a handle for carrying the backboard 800. Rather than having segments attached by hinges 614, as illustrated in FIG. 6, the elongated portion 804 may have a variable distance between the connectors 802 by having multiple segments 806, 808, 810, and 812 which can be releaseably connected together. For example, segment 806 may include a connector 802 on one edge and a recess 814 on another edge to connect to a corresponding protrusion 816 on segment 808. Segment 808 may include a recess 814 on the opposite edge, which can receive a protrusion 816 of a connecting segment.

Multiple back plate segments may be combined together, so additional segments may be provided, with one edge having a recess 814 and the other edge having a protrusion 816. FIG. 8 illustrates four segments, but additional or fewer middle segments may be provided similar to segments 808 and 810. In some examples, segment 806 may connect directly to segment 812 to create a two segment wide back plate. The back plate segments can be disassembled for storage and reassembled to the correct size during mechanical CPR. Although a dovetail connection is shown in FIG. 8, any type of fastener to connect the segments together may be used. For example, a weaver rail connection may be used, or a stud and tube connection, as well as other types of fasteners.

Figure 9:
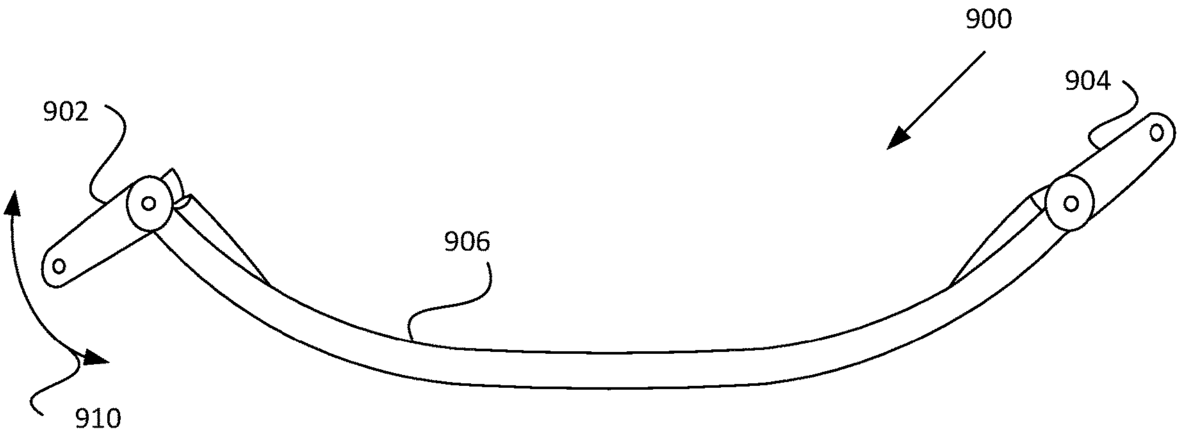
FIGS. 9 and 10 illustrate another back plate according to some examples of the disclosure.
Figure 10:
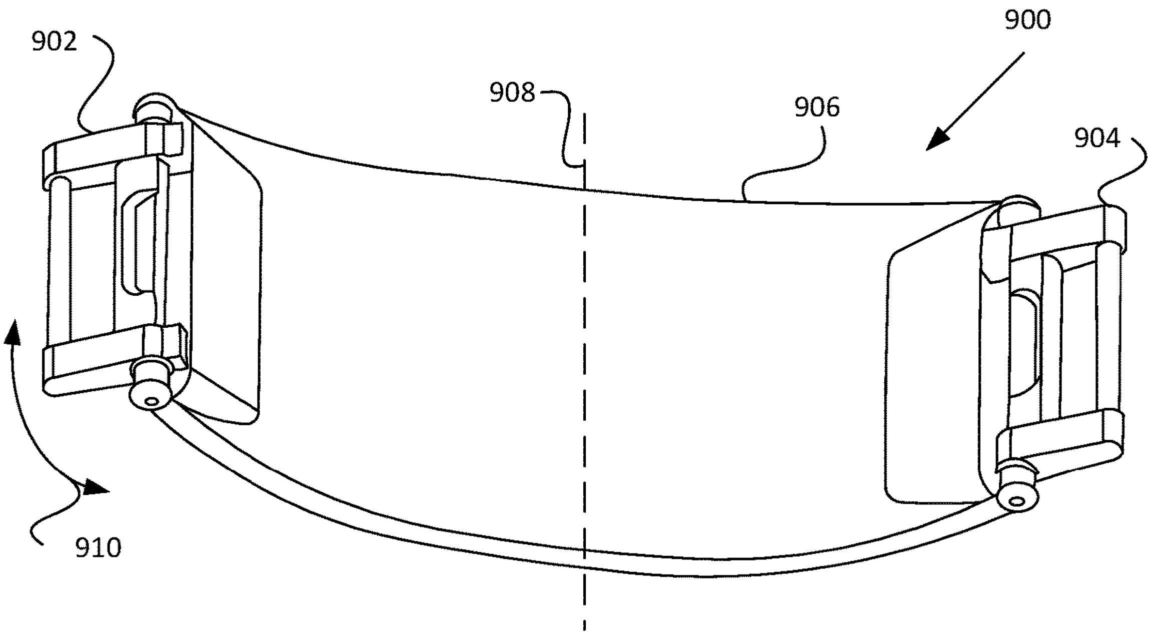

FIGS. 9 and 10 illustrate another example of a backboard 900 according to some examples of the disclosure. Backboard 900 includes two connectors 902 and 904 and an elongated portion 906 extending between the two connectors 902 and 904. Although not illustrated in this example, the elongated portion 906 may have a variable distance like any of the backboards discussed above in some examples.

The two connectors 902 and 904 can pivot about a shaft that is parallel to a central axis 908 of the backboard 900. This direction is also indicated by arrow 910 in FIG. 9. When not in use, the connectors 902 and 904 can be folded underneath the elongated portion 906. During use, the connectors 902 and 904 can be rotated to a desired position.

In the examples illustrated in FIGS. 9 and 10, two possible positions connection positions for the connectors 902 and 904 are shown. First, a lower position, as illustrated by connector 902 which can allow the compression mechanism 114 to sit closer to a smaller patient's chest relative to the elongated portion 906. A second position is illustrated by connector 904 which is a higher position to allow the mechanical compression device to accommodate a patient with a great chest height since the compression mechanism 114 will sit higher relative to the elongated portion 906. When not in use, the connectors 902 and 904 can be rotated about the shaft and hidden beneath the elongated portion 906

A stopper or other locking mechanism, such as a clamp, may be provided to lock the connectors 902 and 904 in their desired position. In some examples, set connection positions may be provided that a rescuer may select. In other examples, a rescuer may select any connection position along the rotating axis for the connectors 902 and 904. Although two connection positions are illustrated in FIGS. 9 and 10, any number of connection positions may be provided. As will be understood by one having ordinary skill in the art, during use the connectors 902 and 904 will most likely be set to the same corresponding position. However, depending on a topography of a patient's chest, it may be beneficial in some situations to set the connectors 902 and 904 at different connection positions.

Figure 11:
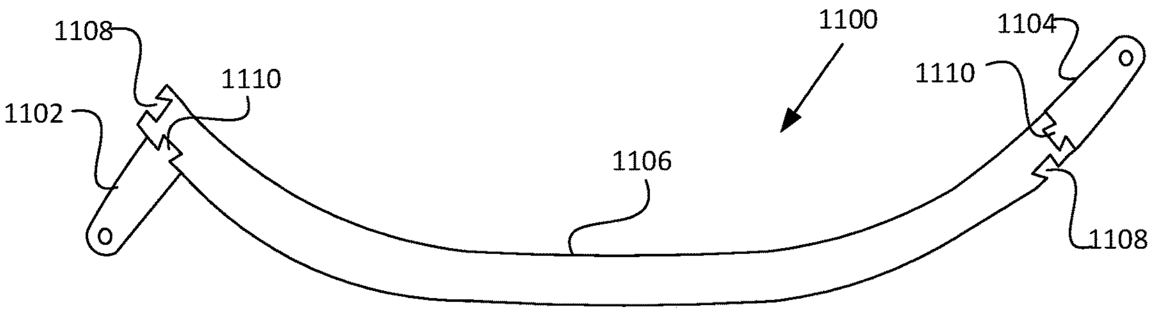
FIGS. 11 and 12 illustrate another back plate according to some examples of the disclosure.
Figure 12:
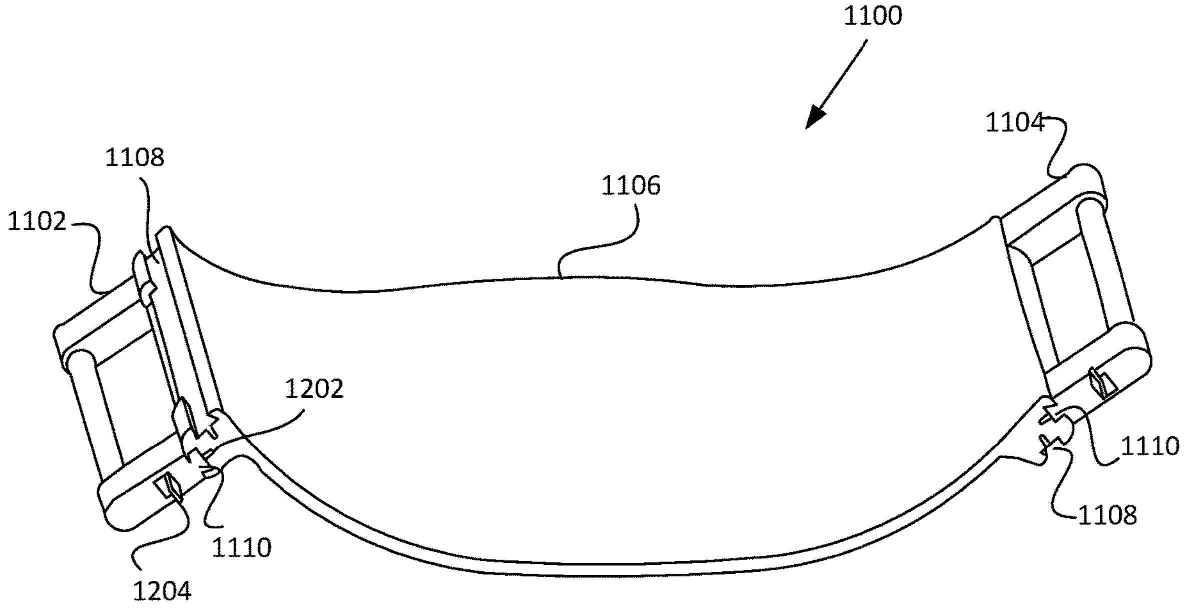

FIGS. 11 and 12 illustrate another example of a backboard 1100 according to some examples of the disclosure. The backboard 1100 includes removable connectors 1102 and 1104. Distal ends of an elongated portion 1106 include a plurality of recesses 1108. Although two recesses 1108 are shown in FIG. 11, more than two 1108 recesses may be provided.

Each of the connectors 1102 and 1104 includes a protrusion 1110 that is structured to fit within the recesses 1108. The connectors 1102 and 1104 can be connected in the desired position to the backboard 1100 to accommodate different patient sizes. For example, in FIG. 11, the connector 1102 is positioned in the bottom recess 1108 to accommodate a smaller patient and connector 1104 is positioned in an upper recess 1108 to accommodate a larger patient. The connectors 1102 and 1104 may be removed when the backboard 1100 is not in use.

Although a dovetail connection is shown in FIGS. 11 and 12, any type of fastener to connect the connectors 1102 and 1104 to the elongated portion 1106 may be used. For example, a weaver rail connection may be used, or a stud and tube connection, as well as other types of fasteners.

FIG. 12 illustrates an example locking mechanism 1202 which may be used in some examples to lock the connectors 1102 and 1104 within the recesses 1108. In some examples, an engagement mechanism 1204 may be provided on one or both sides of the connectors 1102 and 1104. The engagement mechanism 1204 for example may be a component which can be manipulated to engage the locking mechanism 1202, such as plunger. The locking mechanism 1202 engages with some portion of the recesses 1108 to keep the connectors 1102 in place within the recess 1108 during operation of a mechanical compression device.

Figure 13:
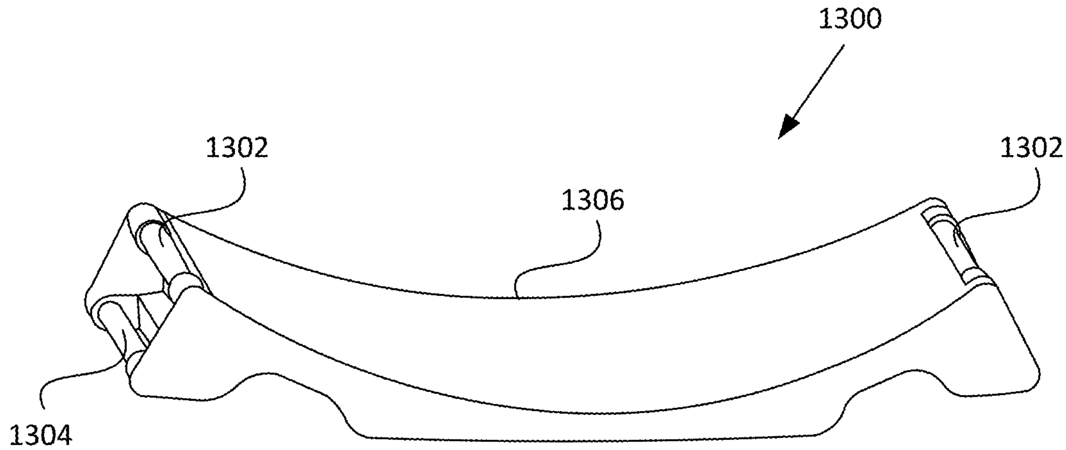
FIGS. 13 and 14 illustrate another back plate with an adjustable connector according to some examples of the disclosure.
Figure 14:
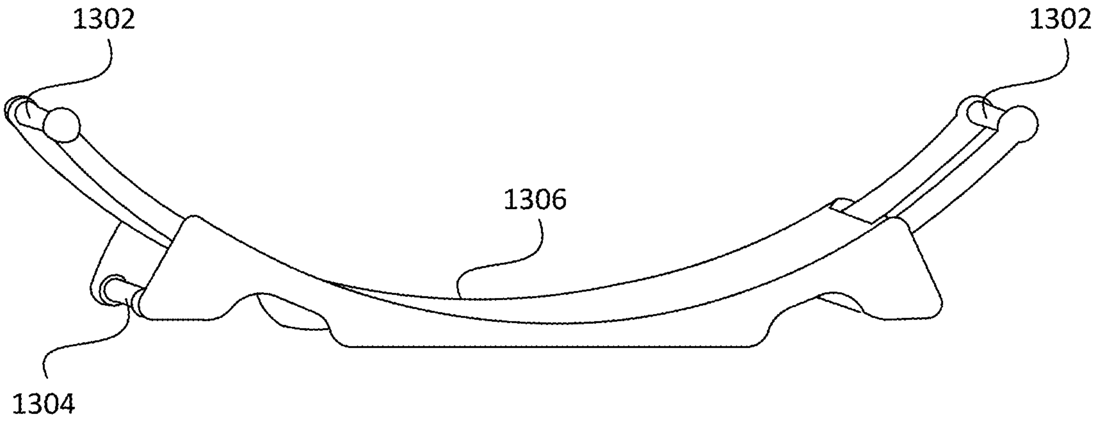

FIGS. 13 and 14 illustrate another example of a backboard 1300 according to some examples of the disclosure. Backboard 1300 can include multiple connectors 1302 and 1304 on each side of an elongated portion 1306 that expands between the connectors 1304 and accommodates a patient when a mechanical chest compression device is attached to one of the connectors 1302 and 1304 on each side. In some examples, the elongated portion 1306 may have a variable width or distance, as discussed above.

Connector 1304 is are stationary connection points for respective legs of a mechanical compression device. Connector 1304 is provided lower relative to connector 1302 to provide a connection point to accommodate smaller patients. When legs of a mechanical compression device are connected or attached to connector 1304, a compression mechanism is lower and positioned closer to a top surface of elongated portion 1306.

Connectors 1302 are extendable relative to the elongated portion 1306. That is, connectors 1302 have a variable distance between each other. As illustrated in FIG. 13, when connectors 1302 are in their retracted position, legs of the mechanical chest compression device cannot attach to the connectors 1302 and can only attached to connectors 1304. When connectors 1302 are each extended, as illustrated in FIG. 14, from the elongated portion 1306, respective legs of the mechanical compression device can attach or couple to the connector 1302 to provide compressions to a chest of a patient. Generally, connectors 1302 are extended to accommodate patients with larger chest heights so that a compression mechanism of a mechanical compression device is positioned at a higher position relative to a top surface of the elongated portion 1306.

As will be understood by one skilled in the art, although not shown, in some examples the extendable connectors 1302 can be locked relative to the elongated portion 1306 and held rigid when attached to a mechanical compression device. Any type of locking mechanism may be used, such as a clamp, to ensure that the extendable connectors 1302 are stable during mechanical CPR. In other examples, the connection and force of the mechanical compression device may keep the extendable connectors 1302 rigid and no locking mechanism is provided or needed.

Figure 15:
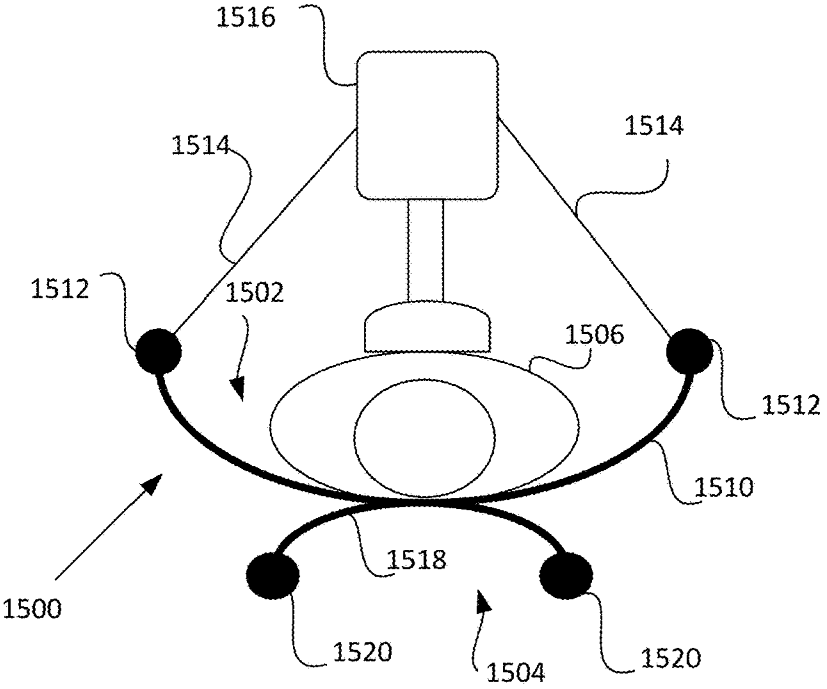
FIGS. 15 and 16 are front views of a backboard having an adult patient side and a pediatric patient size according to some examples of the disclosure.
Figure 16:
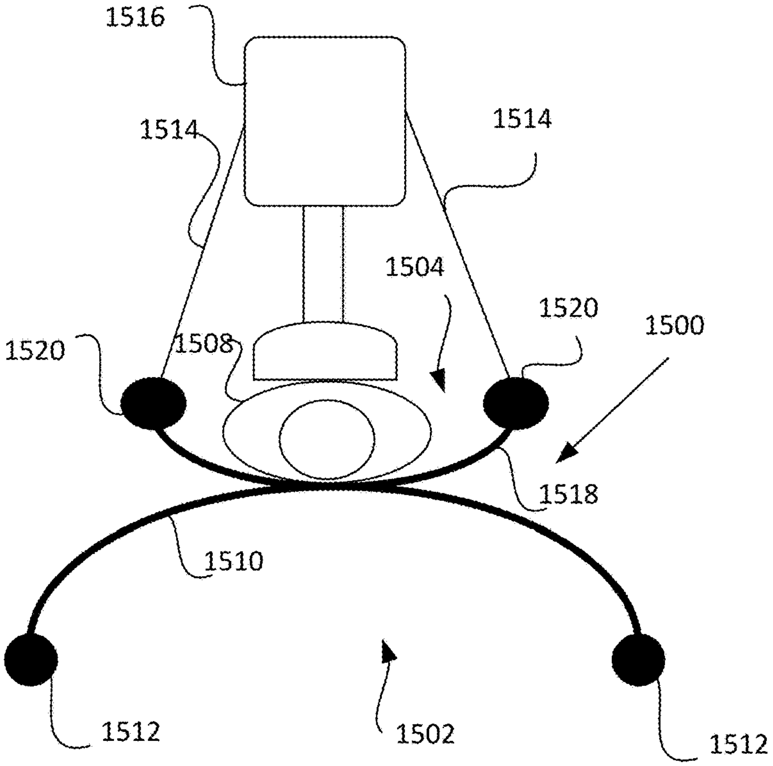

FIGS. 15 and 16 illustrate a back plate 1500 which can accommodate two different patient sizes, an adult patient and a smaller or pediatric patient. Back plate 1500 can include an adult patient side 1502 and a pediatric (or smaller) patient side 1504. FIG. 15 illustrates when the adult patient side 1502 is in use with an adult patient 1506 and FIG. 16 illustrates when the pediatric patient side 1504 is in use with a pediatric or smaller patient 1508.

The adult patient side 1502 can include a curved portion 1510 spanning between two connectors 1512 which are structured to attach to legs 1514 of a mechanical compression device 1516. The pediatric patient side 1504 also includes a curved portion 1518 spanning between two connectors 1520 which are structured to attach to legs 1514 of the mechanical compression device 1516.

Each curved portion 1510 and 1518 are curved differently to accommodate the different patient sizes. For example, curved portion 1510 may be more deeply curved so the patient 1506 sits lower relative to the connectors 1512 and the mechanical compression device 1516. That is, the radius of curvature of the curved portion 1518 can be greater than the radius of the curved portion 1510. This can allow for a patient 1506 with a larger sternum height to receive the compressions. Curved portion 1518, on the other hand, is curved so that the patient 1508 sits higher relative to the connectors 1520 and the mechanical compression device 1514 to allow a patient with a smaller sternum height to receive the mechanical compressions.

When the adult patient side 1502 is in use, the pediatric patient side 1504 supports the adult patient side 1502 on a ground or other surface. Conversely, when the pediatric patient side 1504 is in use, the adult patient side 1502 supports the pediatric patient side 1504 on the ground or other surface.

Figure 17:
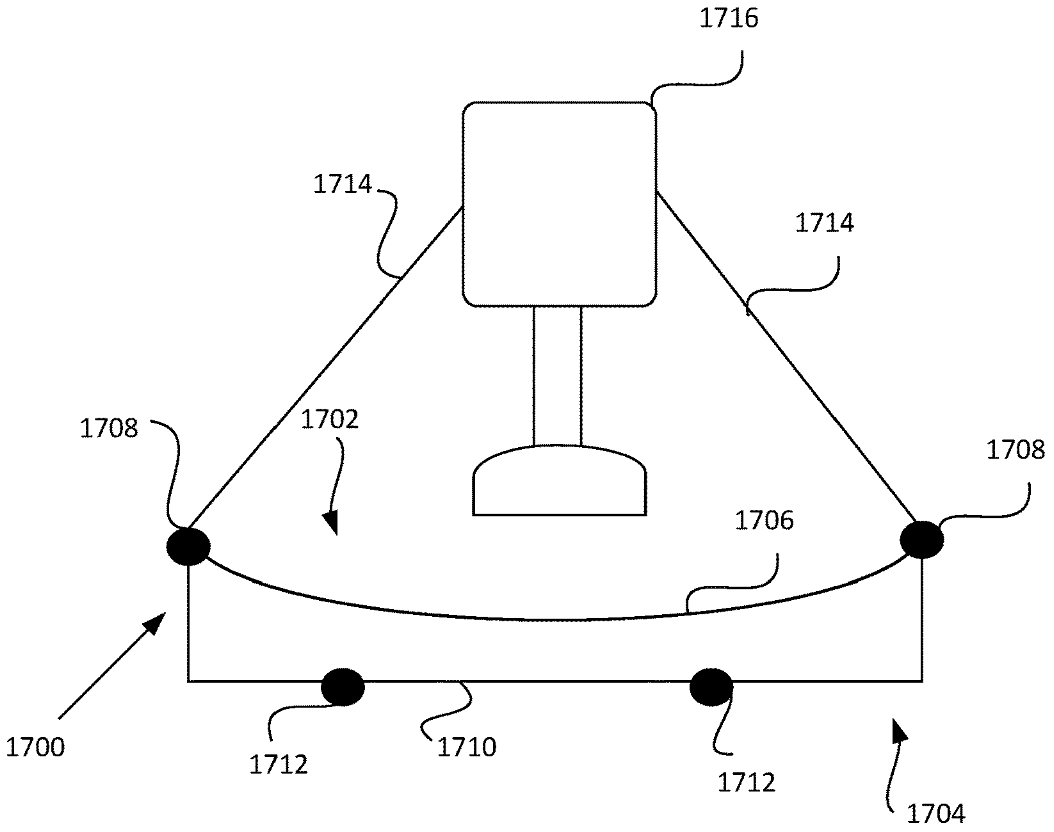
FIGS. 17 and 18 are front views of another backboard having an adult patient side and a pediatric patient size according to some examples of the disclosure.
Figure 18:
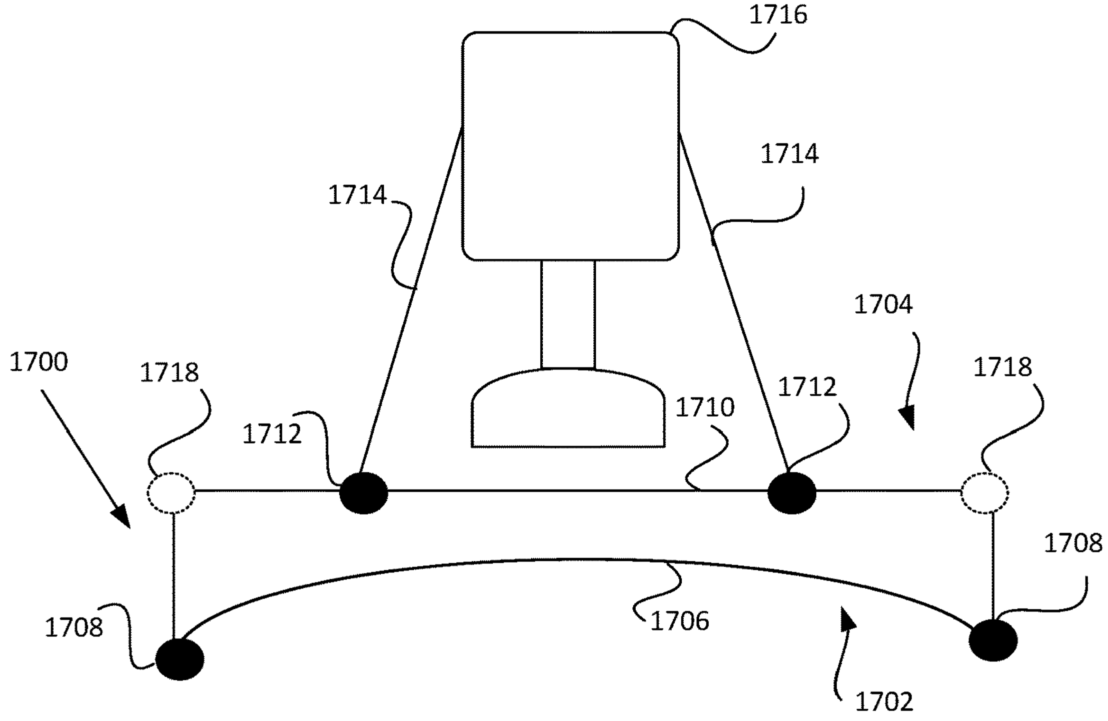

Examples of the disclosure are not limited to the curve shapes shown in the backboard 1500 in FIGS. 15 and 16. FIGS. 17 and 18 illustrate a backboard 1700 that also includes a larger or adult patient side 1702 and a pediatric or smaller patient side 1704.

Backboard 1700 includes a concave portion 1706 on the adult patient side 1702 between two connectors 1708 and a flat portion 1710 on the pediatric patient side 1704 between two connectors 1712. Similar to the backboard 1500, the connectors 1708 and 1702 are structured to attach to or receive a leg 1714 of a mechanical compression device 1716.

In some examples, although referred to as a flat portion 1710 on the pediatric patient side 1704, the pediatric patient side 1704 may include a convex portion with a center portion that is flat to accommodate a patient. That is, both the pediatric patient side 1710 and the adult patient side 1706 may have a curvature, and the curvature may include a flat portion. A radius of the curvature of the pediatric patient side 1710 is less than a radius of the curvature of the adult patient side 1706. In other examples, rather than a convex portion, a concave portion with a center flat portion may be provided on the pediatric patient side 1704. In some examples, the flat portion 1710 can be a convex with a radius different than the opposite side curvature radius. Similar to the backboard 1500 discussed above, when the adult patient side 1702 is in use, the pediatric patient side 1704 supports the adult patient side 1702 on a ground or other surface. Conversely, when the pediatric patient side 1704 is in use, the adult patient side 1702 supports the pediatric patient side 1704 on the ground or other surface.

The pediatric patient side 1704 may additionally or alternatively include connectors 1718 which are located on the outer edges of the flat portion 1710. If both connectors 1718 and 1712 are included in the backboard 1000, a rescuer can choose which connectors 1712 or 1718 to use to position the mechanical compression device 1716 in the needed position for the smaller patient.

Figure 19:
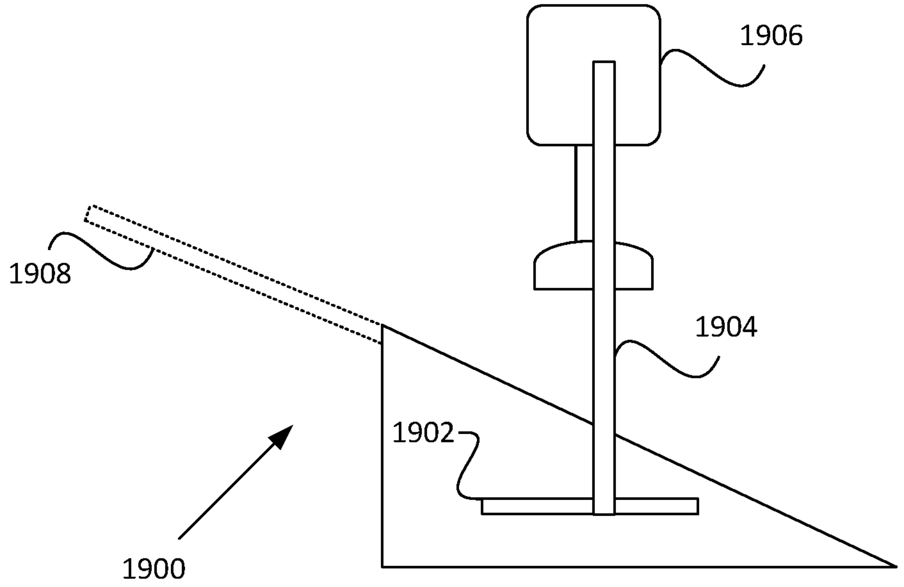
FIG. 19 is an example of a wedge-shaped backboard according to some examples of the disclosure.

FIG. 19 illustrates another example of a backboard 1900 that can accommodate different patient sizes. Backboard 1900 may be wedge-shaped to facilitate a smooth body position for the patient since lifting the patient chest only may lead to reduced efficacy of the CPR being administered.

The backboard 1900 may be shaped so that a first side of the backboard 1900 provides a first angled incline and the second side of the backboard 1900 provides a second angled incline, the second angled incline being greater than the first angled incline to accommodate a smaller patient. The second side allows a smaller patient to be higher and therefore closer to the chest compression mechanism.

The backboard 1900 may include a connector 1902, which may be, for example, a connector rail which can receive a claw-like attachment member of a leg 1904 of the chest compression device 1906.

Rather than having two sides, the backboard 1900 may be longer and have a longer connector 1902 so that a patient can be placed at the desired position along the backboard 1900. For example, smaller patients may be placed on the higher inclined angle of the backboard 1900 while larger patients may be placed lower on the inclined angle of the backboard 1900. The mechanical compression device 1906 may then be connected to the connector 1902 by the legs 1904 at a location that corresponds to the compression point on the patient.

Any of the backboards discussed above may include a retractable or detachable head rest to accommodate a head of a patient and to prevent the chest from being higher than the head of the patient. Such a retractable or detachable head rest 1908 is illustrated in FIG. 19, but as will be understood by one skilled in the art, could be included with any one of backboard 800, backboard 1000, and backboard 1900. Additionally or alternatively, the backboards 800, 1000, and 1900 may be the length of the patient to help support the head of the patient relative to the backboard. For ease of transportation, the backboard 800, backboard 1000, and backboard 1900 may be collapsible or otherwise contractible into a smaller footprint for ease of transportation and storage. For example, if the backboard 1500, 1700, or 1900 is the length of the patient, the backboard 1500, backboard 1700, or backboard 1900 may be telescoping to reduce the length of the backboard when not in use.

Figure 20:
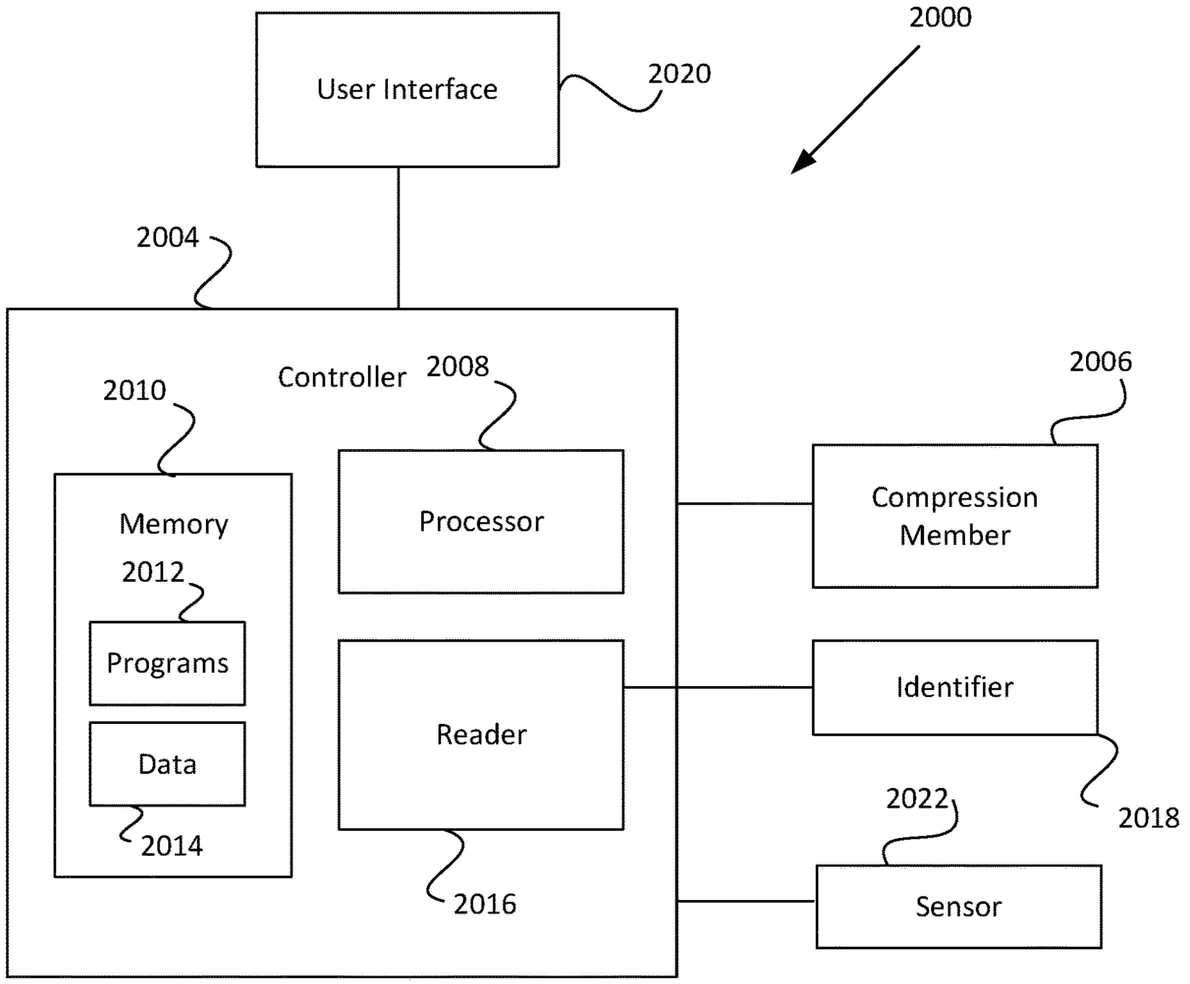
FIG. 20 is a schematic block diagram of a mechanical compression device according to some examples of the disclosure.

FIG. 20 illustrates an example schematic block diagram of a mechanical compression device 2000. As will be understood by one skilled in the art, the mechanical compression device 2000 may include additional components not shown in FIG. 20. The mechanical compression device 2000 includes a controller 2004, which may be in electrical communication with a compression member 2006, which can include a piston and a suction cup.

The controller 2004, as will be discussed in more detail below, provides instructions to the compression member 2006 to operate the compression member 2006 at a number of different rates, waveforms, depths, heights, duty cycles or combinations thereof that change over time. Example chest and/or abdomen manipulation instructions or protocols include compressing a chest and/or abdomen and decompressing and/or expanding of a chest and/or abdomen of a patient.

The controller 2004 may include a processor 2008, which may be implemented as any processing circuitry, such as, but not limited to, a microprocessor, an application specific integration circuit (ASIC), programmable logic circuits, etc. The controller 2004 may further include a memory 2010 coupled with the processor 2008. Memory 2010 can include a non-transitory storage medium that includes programs 2012 configured to be read by the processor 2008 and be executed upon reading. The processor 2008 is configured to execute instructions from memory 2010 and may perform any methods and/or associated operations indicated by such instructions. Memory 2010 may be implemented as processor cache, random access memory (RAM), read only memory (ROM), solid state memory, hard disk drive(s), and/or any other memory type. Memory 2010 acts as a medium for storing data 2014, such as instructions for the compression member 2006 based on a type of suction cup attached, event data, patient data, etc., computer program products, and other instructions.

Controller 2004 may further include a reader 2016. The reader 2016 can receive a signal or otherwise sense a type of backboard and orientation of a backboard through an identifier 2018. The reader 2016 may be, for example, an RFID reader, a quick response (QR) code reader, or may receive an input signal from an attached backboard.

The controller 2004 may be located separately from the compression member 2006 and may communicate with the compression member 2006 through a wired or wireless connection. The controller 2000 also electrically communicates with a user interface 2020. As will be understood by one skilled in the art, the controller 2004 may also be in electronic communication with a variety of other devices, such as, but not limited to, a communication device, another medical device, etc.

Operations of the medical device 2000 may be effectuated through the user interface 2020. The user interface 2020 may be external to or integrated with a display. For example, in some examples, the user interface 2020 may include physical buttons located on the medical device 2000, while in other examples, the user interface 2020 may be a touch-sensitive feature of a display. The user interface 2020 may be located on the medical device 2000, or may be located on a remote device, such as a smartphone, tablet, PDA, and the like, and is also in electronic communication with the controller 2004. In some examples, controller 2004 can receive a rate, a waveform, and/or depth input from the user interface 2020 and, responsive to the rate, the waveform, and/or depth input, cause the compression member 2006 to move to adjust the rate, waveform, and/or depth of the compression, decompression, or expansions during a session.

The backboard, such as any one of the backboards discussed above, may have one or more identifiers 2018, which may be an RFID tag, a QR code on the suction cup, a chip, such as, but not limited to, an erasable programmable read-only memory, or any other identifier 2018 that has a proprietary code or other identification which can be read by the reader 2016. The identifier 2018 may be located anywhere on or in the backboard. The backboard may also include multiple identifiers 2018 to indicate a type and orientation of an attached backboard.

For example, an identifier 2018 may be an RFID tag embedded in both an adult patient side and a pediatric patient side of the backboard, and the reader 2016 can read the RFID tag that is closest, telling the controller 2004 what orientation the backboard is in and setting a protocol based on the orientation. Additionally or alternatively, the connectors of the backboard may include a chip or other identifier 2018 which is electrically connected to the reader 2016 by the connectors. That is, the properties of the circuit created by the electrical connection between the identifier 2018 and the reader 2016 can instruct the controller 2004 what orientation the backboard is in. A QR code may be printed on each side of the backboard and can be readable by the reader 2016. Depending on which QR code is read by the reader 2016 would indicate which orientation the backboard is in.

Additionally or alternatively, one or more sensors 2022 may be attached to mechanical components of the mechanical compression device 2000 and the controller 2004 can determine what type of backboard is attached based on the position of components of the mechanical compression device 2000. For example, legs of mechanical compression device may be attached to a central unit by hinges, as illustrated in FIG. 1. The one or more sensors 2022 can determine the angle of the hinge and from that information determine what type of backboard is attached to the legs. For example, if the angle is greater than a threshold, the controller 2004 may determine the backboard is an adult orientation, whereas if the angle is less than a threshold, the controller 2004 may determine the backboard is in the pediatric orientation.

Additionally or alternatively, the connector of the backboard that attaches to the leg of the mechanical compression device may have a particular width or diameter to indicate what orientation the backboard is in. For example, the adult side of the backboard may have a wider connector than the pediatric side of the backboard. A sensor 2022 may be provided in the attachment mechanism of the leg of the mechanical compression device 2000 and based on how wide or narrow the claw is to engage the connector can inform the controller 2004 which orientation the backboard is in.

The memory 2010 can store a number of CPR protocols that can be activated based on the identifier 2018 read by the reader 2016. The CPR protocols may include, for example, at least one of a pediatric CPR protocol and an adult CPR Protocol. The protocol may be activated by the controller 2004 based on the identifier 2018 stored on the backboard. Examples of the disclosure, however, are not limited to these types of protocols and other protocols may also be stored in the memory 2010 and activated based on the identifier 2018 on or in the backboard.

Figure 21:
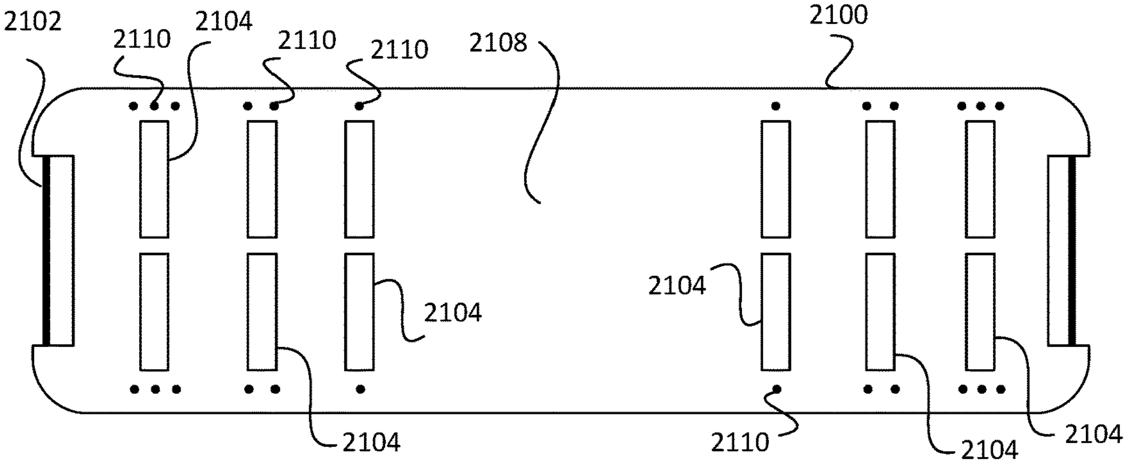
FIG. 21 is a top view of a backboard having stabilizing members according to some examples of the disclosure.
Figure 22:
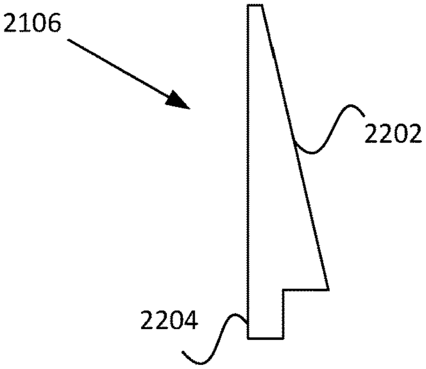
FIG. 22 is a cross-section view of a stabilizing member according to some examples of the disclosure.
Figure 23:
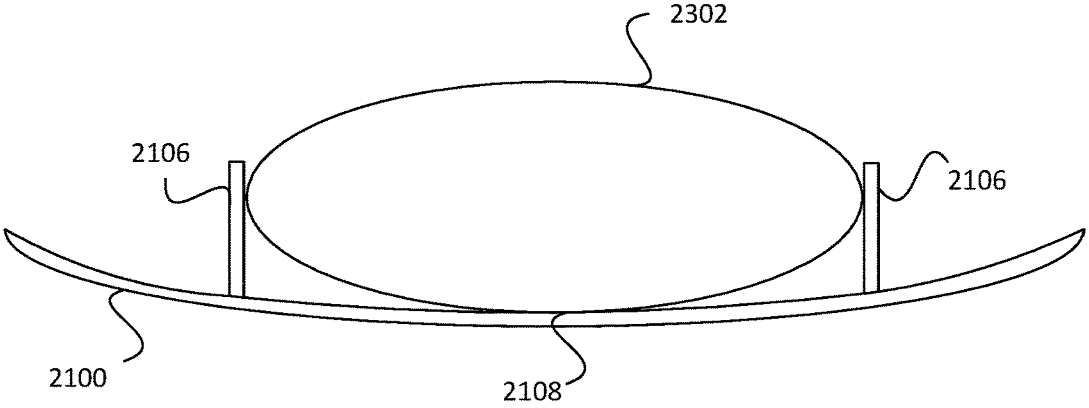
FIG. 23 is a cross-section view of the backboard of FIG. 21 with the stabilizing member of FIG. 22.

FIGS. 21-23 illustrate another example of a backboard 2100 that can accommodate different patient sizes. Similar to many of the backboards discussed above, backboard 2100 can include a connection rail 2102 on opposite ends of the backboard 2100. The connection rails 2102 are structured receive a leg of a chest compression device to attach the chest compression device to the backboard 2100. For example, an end portion of legs of the chest compression device may include a claw-like member that can grab or attach onto the connection rails 2102. However, other types of connections may be used as well.

Backboard 2100 can include a number of different apertures 2104 that are structured or shaped to receive stabilizing members 2106, which are illustrated in FIGS. 22 and 23. While FIG. 21 illustrates three apertures 2104 on each side of the backboard 2100, examples of the disclosure are not limited to six apertures 2104 and any number of apertures may be provided in the backboard 2100, as long as an equal number of apertures 2104 are provided on each side of the backboard between a patient receiving section 2108 of the backboard. Further, while FIG. 21 illustrates the apertures 2104 having a support beam in the middle, examples of the disclosure are not limited to these types of apertures 2104 in the backboard 2100. A shorter length aperture with no support beam may be provided within the backboard 2104 to receive the stabilizing members 2106.

During use, two stabilizing members 2106, such as stabilizing members 2106 shown in FIG. 22, can be inserted into corresponding apertures 2104 on each side of the backboard 2100. The stabilizing members 2106 may include a wedge shape 2202 with a protrusion 2204 structured to be received in the apertures 2104 of the backboard 2100. The stabilizing members 2106 may be made of any stiff or semi-stiff material, such as, but not limited to, foam or plastic. While FIG. 22 shows a side view of the stabilizing member 2106, as will be understood by one skilled in the art, the stabilizing member 2106 may have two protrusions 2204 to accommodate an aperture 2104 with a support beam in the middle. The wedge-shape of the stabilizing member 2106 allows the protrusion 2204 to fit within the aperture such that the wedge portion of the stabilizing member 2106 is generally vertical relative to the backboard 2100. Further, stabilizing members 2106 may be any shape, such as a flat rectangular or square shape, that can attach to the apertures 2104, and is not limited to a wedge-shaped 2202 stabilizing member 2106. As long as the stabilizing members 2106 include a narrower protrusion 2204 with a wider body, the stabilizing members 2106 will be capable of standing up within the apertures 2104 to laterally stabilize a patient 22.

In some examples, markers 2110 may be painted or printed on the backboard 2100 to assist a rescuer in placing the stabilizing members 2106 in corresponding apertures 2104 on each distal end of the backboard 2100. The markers 2110 can help a rescuer to ensure the stabilizing members 2106 are located at the same location on each distal end of the backboard 2100 to provide balance of the patient on the patient receiving section 2108 of the backboard 2100 and to help center a patient 2302 under a piston, such as piston 116.

For example, if markings 2110 are provided, the inner most apertures 2104 may include a single dot marker 2110 to indicate a very small or narrow patient, while the middle apertures 2104 includes two dot markers 2110 and the outside apertures 2104 include three dot markers 2110 to show an increase in patient size. This can assist a rescuer to ensure that a patient is located in the middle of the backboard 2100 for compressions and that there is equal spacing between the stabilizing members 2104 and the connection rails 2102. While markers 2110 are shown as dots in FIG. 21, examples of the disclosure are not limited to dot markers 2110 and may be any type of marking to indicate the spacing of the stabilizing members 2106, such as numbers or words.

Figure 24:
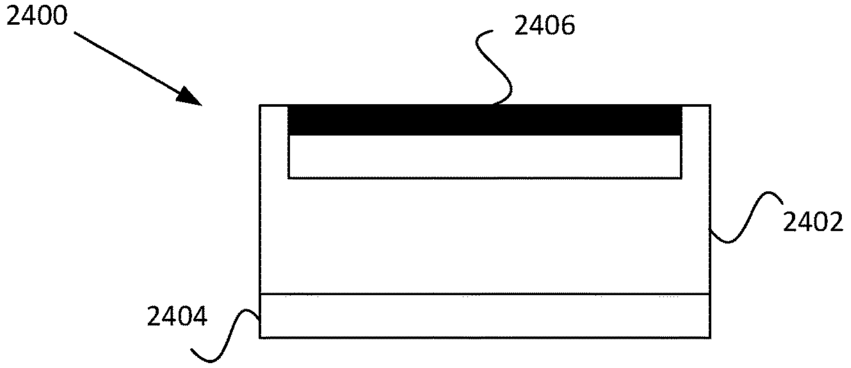
FIG. 24 is a front view of another example of a stabilizing member according to some examples of the disclosure.

FIG. 24 illustrates another example of a stabilizing member 2400 according to some examples of the disclosure. Stabilizing member 2400 can include, similar to stabilizing member 2106, a wedge-shape 2402 and a protrusion 2404. Similar to stabilizing member 2106, the stabilizing member 2400 does not have to be wedge-shape, but can be any shaped member with a protrusion 2404 structured to fit within a corresponding hole or aperture of a backboard. Stabilizing member 2400, however, may include a connection rail 2406 that can attach or connect to a leg of a corresponding compression device.

Figure 25:
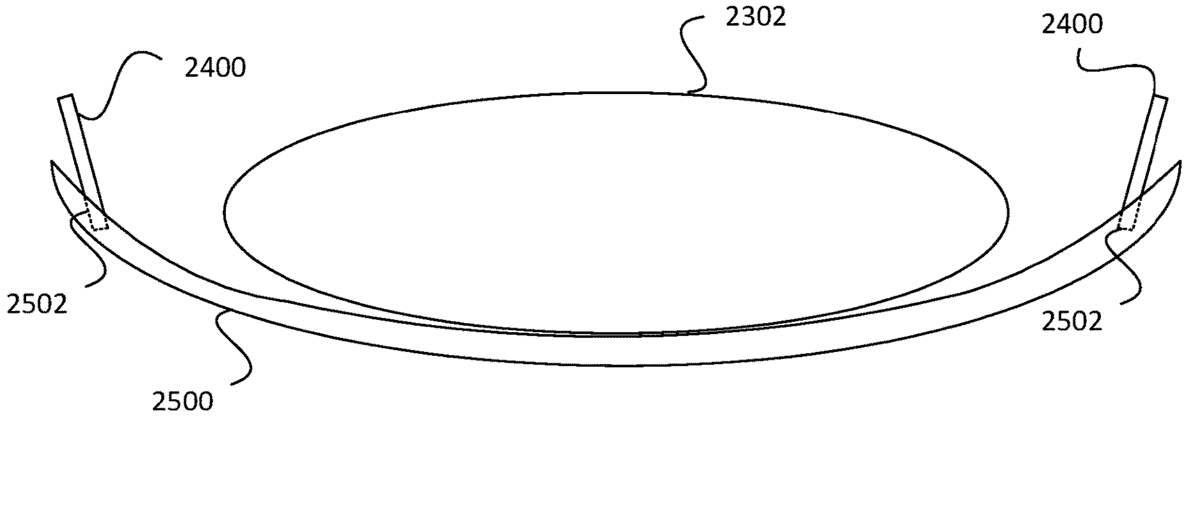
FIG. 25 is a cross-section view of a backboard with the stabilizing member of FIG. 24.

Stabilizing member 2400 can fit within the apertures 2104 of FIG. 21, or, in some examples, the apertures 2502 can be angled within the backboard 2500 so the stabilizing member can attach to a leg of the compression device. The rail or shaft 2406 of the stabilizing member 2400 may be positioned to be above the connection rail 2102 of the backboard in some examples. In other examples, the stabilizing member 2400 can be longer so that the rail or shaft 2406 of the stabilizing member 2400 extends out past the connection rail 2102. Further, although only two apertures are shown in FIG. 25 in the backboard 2500, multiple apertures may be provided. If the stabilizing member 2400 is connected or coupled with an inner aperture for a smaller patient, the legs of the compression device may connect to the connection rail 2102 of the backboard rather than the shaft 2406 of the stabilizing member 2400.

Figure 26:
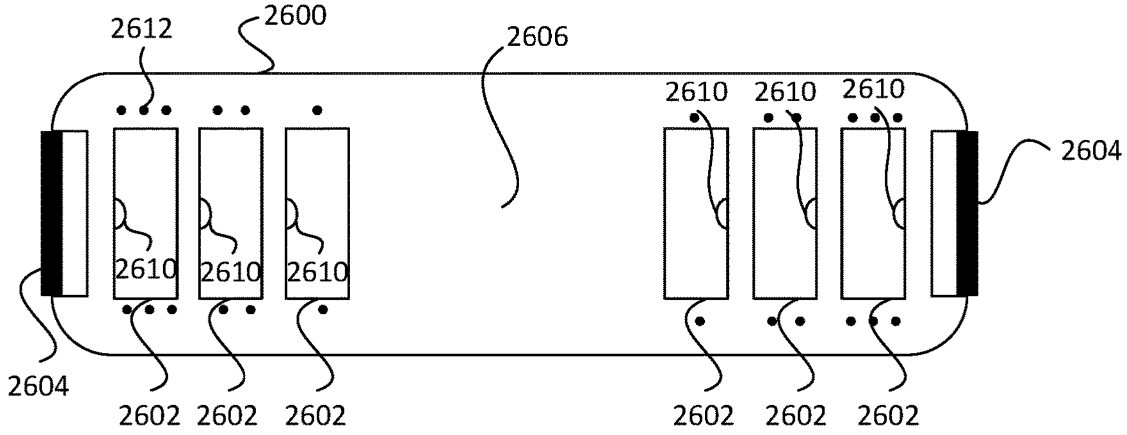
FIG. 26 is a top view of another backboard having lateral supports according to other examples of the disclosure.
Figure 27:
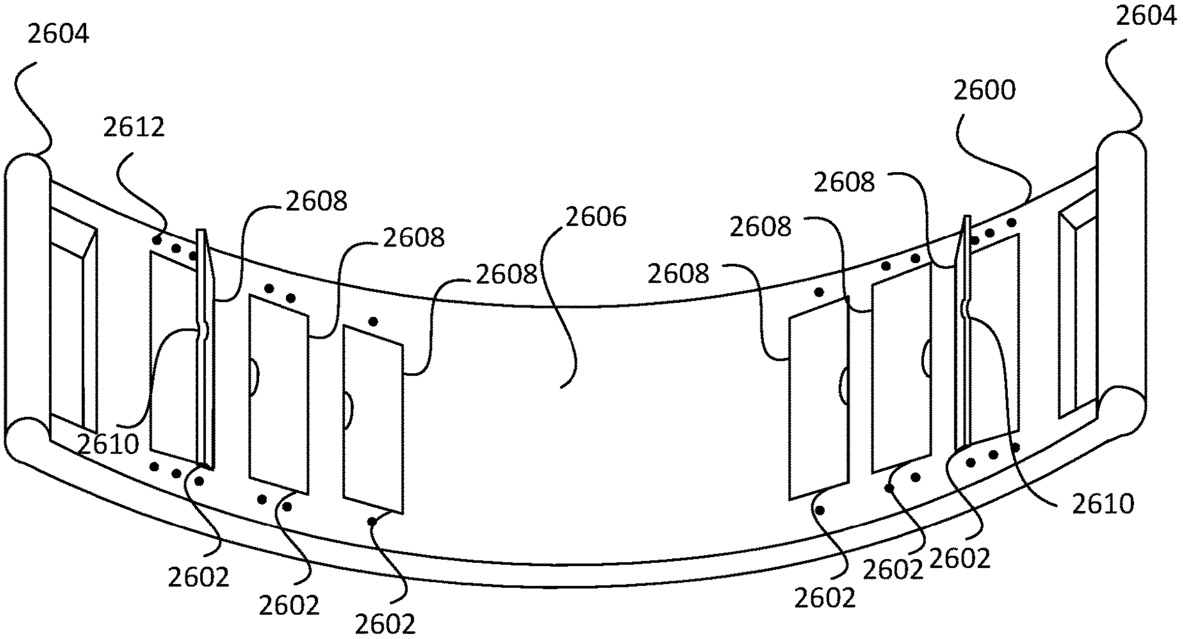
FIG. 27 is a top perspective view of the backboard of FIG. 26.

FIGS. 26 and 27 illustrate another example of a backboard 2600 according to some examples of the disclosure. In this example, stabilizing members 2602 are provided directly within the backboard 2600. While FIG. 26 illustrates six stabilizing members 2602, three on each distal end of the backboard 2600, examples of the disclosure are not limited to this number of stabilizing members 2602. Any number of stabilizing members 2602 may be provided.

Similar to other backboards discussed above, backboard 2600 includes connection rails 2604 to connect to legs of a compression device and a patient receiving area 2606 located in the center of the backboard 2600.

Each of the stabilizing members 2602 may be rotatably connected to the backboard 2600. For example, the stabilizing members 2602 may be rotatably connected to the backboard 2600 by a hinge 2608 or any other rotation means. The stabilizing members 2602 may each have a handle 2610 either cut into the stabilizing member or some type of pull or strap for a rescuer to grab and rotate the stabilizing member into a vertical position that is generally perpendicular to the surface of the backboard 2600. The hinge 2608 may be a locking hinge that locks the stabilizing member 2602 into the generally vertical position. Other locking mechanisms may also be provided, such as a clamp. In some examples, no handle is provided, but a rescuer may push on the bottom of the stabilizing member 2602 to rotate the stabilizing member 2602 into a generally vertical position. The stabilizing member 2602 can be locked into the generally vertical position using any known locking mechanism.

Similar to backboard 2100, markers 2612 may be provided to help assist a rescuer in confirming that corresponding stabilizing members 2602 are lifted on each side of the backboard 2600. Markers 2612 may be any type of marker to designate corresponding stabilizing members 2602 on each side of the backboard 2600.

FIG. 27 illustrates a perspective view of the backboard 2600 with two of the stabilizing members 2602 lifted into the generally vertical position. The stabilizing members 2602 stabilize a patient between the stabilizing members 2602 when a compression device is attached to the backboard 2600 to help center a patient under a piston 116 during chest compressions. The stabilizing members 2602 can prevent the patient from sliding laterally along the backboard 2600 during operation of the compression device.

Figure 28:
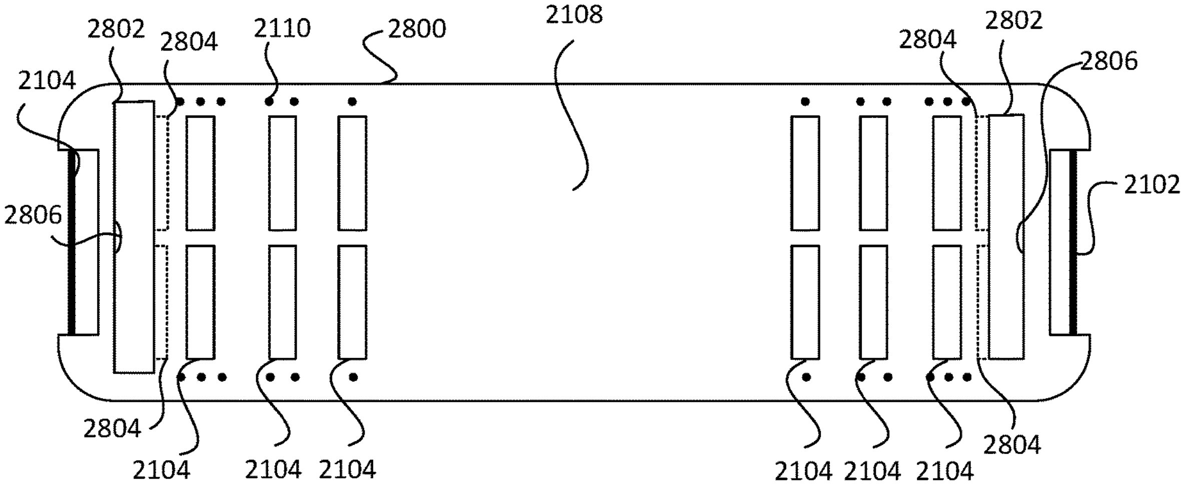
FIG. 28 is a top view of another backboard having lateral supports according to other examples of the disclosure.

In another example, FIG. 28 illustrates a backboard 2800 with removable stabilizing members 2802. Backboard 2800 includes a number of features similar to those shown in FIG. 21 and as such, those features are shown with the same reference numbers are those discussed above. For example, similar to backboard 2100, backboard 2800 can include a number of apertures 2104 to receive stabilizing members, markers 2110, a patient receiving portion 2108, and connection rails 2102.

Figure 29:
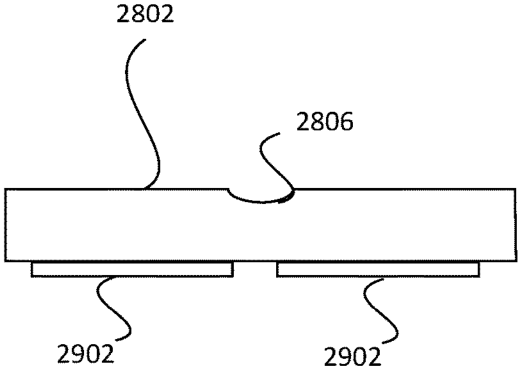
FIG. 29 is a front view of a lateral support of FIG. 28.

FIG. 29 illustrates the stabilizing member 2802. The stabilizing member 2802 may include one or more protrusions 2902 that are structured to be accommodated within the apertures 2104.

In the example backboard 2800, the stabilizing members 2802 may be stored directly within the backboard 2800 itself, rather than within a carrying case for the backboard. For example, the stabilizing member 2802 may fit within an aperture of the backboard. While FIG. 28 shows the stabilizing members 2802 stored at the end of the backboard 2800 near the connection rails 2102, the stabilizing members 2802 may also be stored within the patient receiving portion 2108 in some examples.

An aperture may be provided within the backboard 2800 to receive the stabilizing member 2802, and one or more grooves 2804 may be located within the center of the backboard 2800, as shown by dashed lines, to receive the protrusions 2902 when the stabilizing member 2802 is stored within the backboard 2800 itself. The stabilizing member 2802 may include a handle 2806 to assist with a rescuer pulling the stabilizing member out of the backboard 2800 and placing into the apertures 2104 to stabilize the patient.

Figure 30:
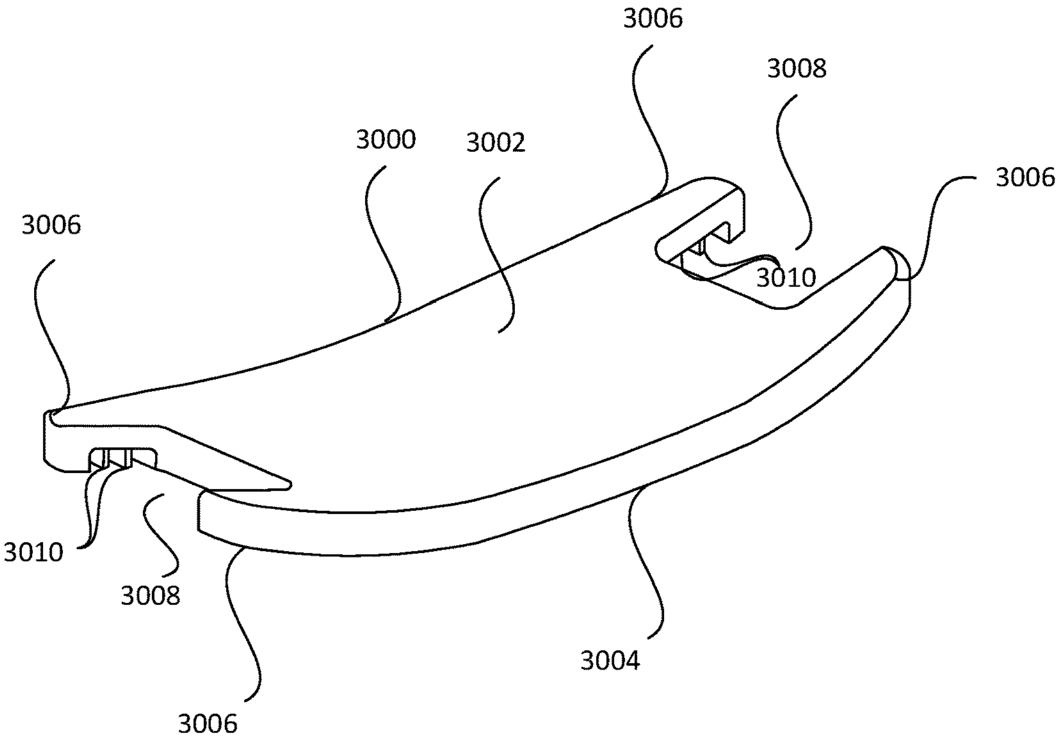
FIG. 30 is a perspective view of a backboard according to some examples of the disclosure.

FIG. 30 illustrates another example backboard 3000 according to some examples of the disclosure. Backboard 3000 includes a patient receiving surface 3002 and a bottom surface 3004 opposing the patient receiving surface 3002. The backboard 3000 includes two protrusions 3006 defining an opening or gap 3008 to accommodate a leg of a compression member on each distal end of the backboard 3000. Each of the protrusions 3006 include a number of projections 3010 on the bottom 3004 of the backboard 3000. As will be discussed in more detail below, the projections 3010 on each protrusion 3006 is structured to attach to a leg of a compression device, such as leg 108 of compression device 100 to the backboard. That is, rather than a leg connecting to a connection rail, as discussed above in some examples, the leg of the compression device can connect or attached to the projections 3010.

Figure 31:
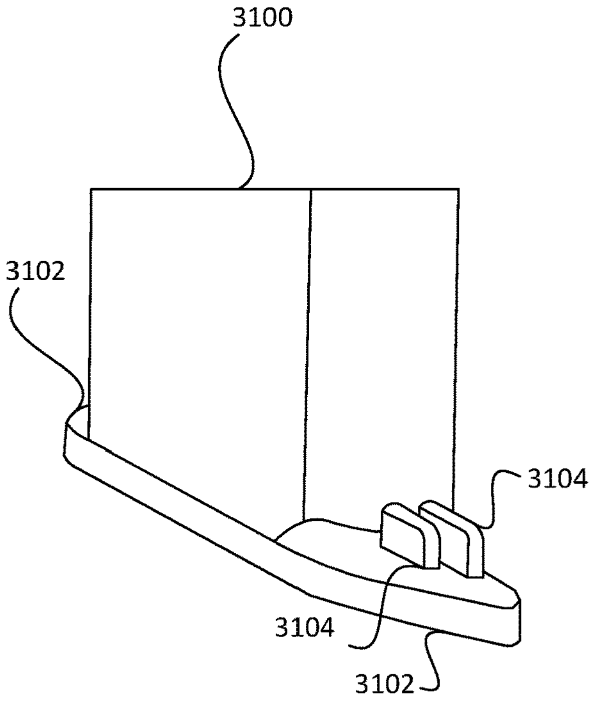
FIG. 31 is a perspective view of an end portion of a leg of a chest compression device according to some examples of the disclosure.

FIG. 31 illustrates an example bottom portion of a leg 3100 of a compression device that can attach to the backboard 3000. As will be understood by one skilled in the art, the leg 3100 may be used with the compression device 100 illustrated in FIG. 1, rather than the leg 108 shown in FIG. 1.

Leg 3100 can include a base 3102 on each side of the leg 3100. Each base can include a number of receivers, or protrusions 3104. The protrusions 3104 are spaced apart to accommodate a projection 3010 of the backboard 3000. While a side view of the leg 3100 is shown, each base 3102 of each leg includes protrusions 3104. The protrusions 3104 may be different heights or may be the same height.

Figure 32:
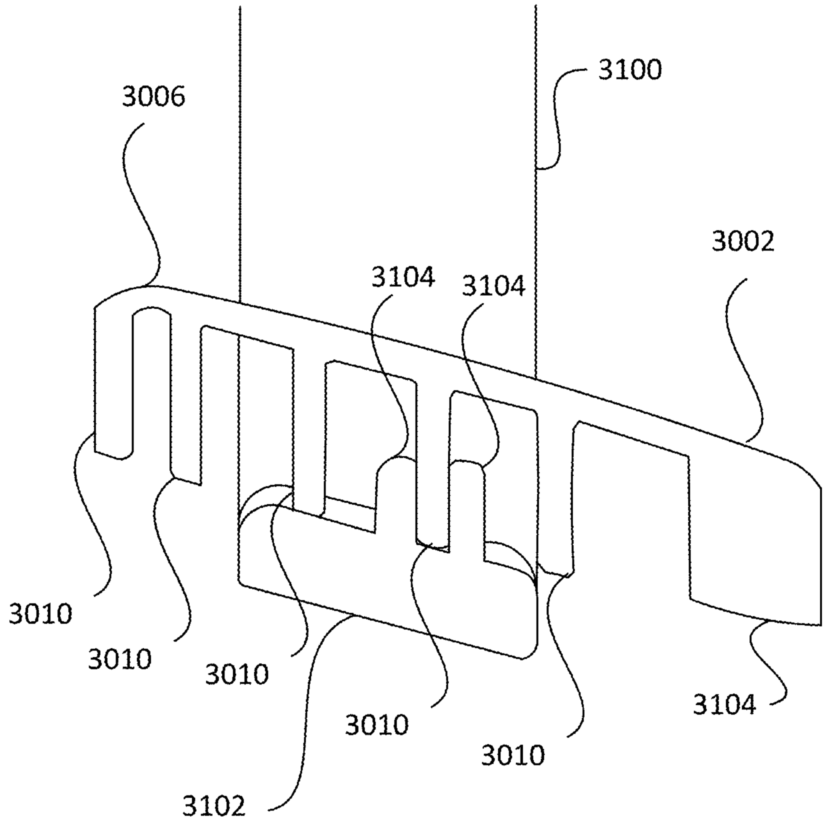
FIG. 32 is a cross-section view of the leg of FIG. 31 attached to the backboard of FIG. 30.

The projections 3010 can be received between or around the protrusions 3104, to create a hook and receiver connection to attach the baseboard 3000 to the leg 3100, as shown in FIG. 32. FIG. 32 illustrates a cross-section view of the backboard 3000 connected to the leg 3100 to illustrate the connection of the backboard 3000 to the base plate 3102 by the protrusions 3104. Any one of the projections 3010 of the protrusion 3006 may be received between the projections 3010 and protrusions 3104 of the leg 3100. This can allow the space or width between the legs 3100 of the back compression device to move closer together or further from each other to accommodate different patient sizes. The different widths of the legs 3100 may also help stabilize a patient during chest compressions.

In some examples, the projections 3010 may be spaced such that both of the protrusions 3104 can fit between two projections 3010. A projection 3010 may fit between the space of the protrusions 3104, providing a number of different connection points and variability in the width between the legs 3100. That is, the legs 3100 are able to adjust laterally with respect to the backboard 3000 to accommodate different patient sizes. When performing compressions with a compression device, the projections 3010 and the protrusions 3104 work together to prevent movement of the backboard relative to the legs 3100 of the compression device.

Figure 33:
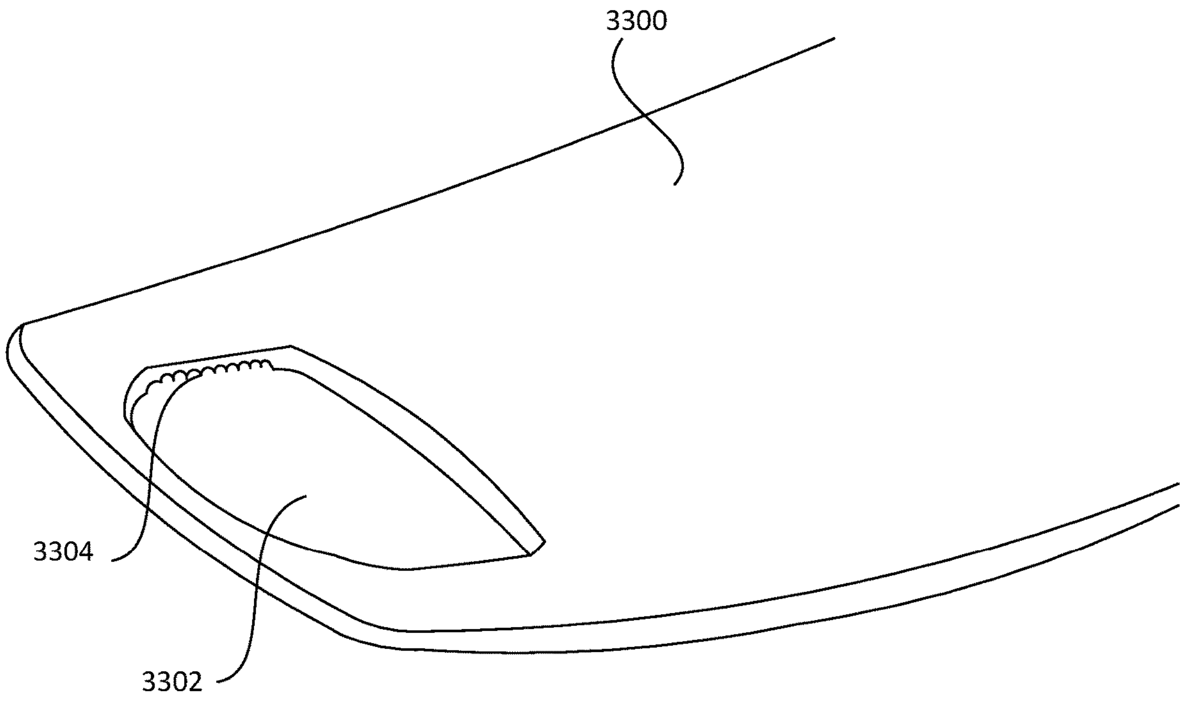
FIG. 33 is a perspective view of one end of a backboard according to some examples of the disclosure.

FIG. 33 illustrates a distal end of an alternative backboard 3320. As will be understood by one skilled in the art, the other distal end of the backboard 3320 would be identical. The backboard 3320 includes an opening 3322 on each side of the backboard to receive a leg of the compression device. The opening 3322 is defined by the distal end of the backboard 3320.

The opening 3322 can include a number of evenly spaced grooves 3326. The grooves 3326 may be formed by a number of projections with a divot between the projections. The grooves 3326 are structured to accommodate spring-loaded shafts 3402 of a leg 3400, which is illustrated in FIG.

34. While only a single leg 3400 is shown, the other leg of the compression device would have the same features.

Though grooves 3304 are shown in the backboard 3300, examples of the disclosure are not limited to grooves 3304 and may be any member than can prevent movement of a leg 3400. For example, rather than grooves 3304, a number of protrusions could be provided on each side of the opening 3302, similar to those discussed above in FIG. 30. Further, the grooves 3304, or any other means, are mirrored on opposite sides of the opening 3302. That is, there is a corresponding groove 3304 or other means on one side of the opening 3302 directly opposite the other side of the opening 3302.

Figure 34:
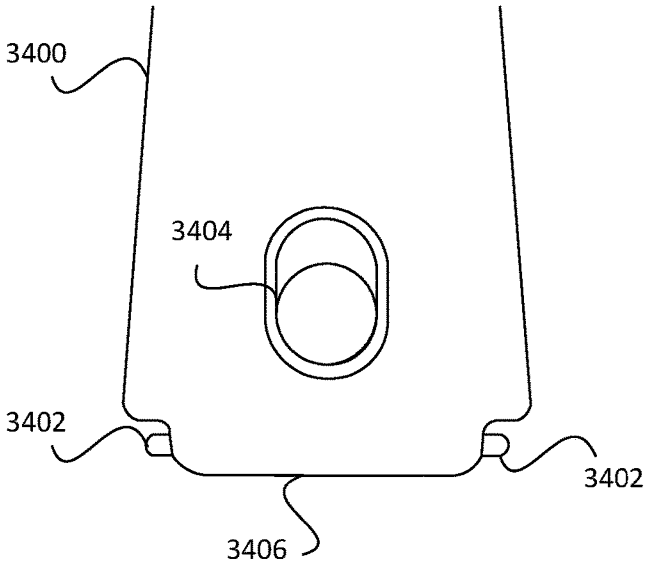
FIG. 34 is a perspective view of an end portion of a leg of a chest compression device according to some examples of the disclosure.

FIG. 34 illustrates an example leg 3400 that may be used with the compression device 100 instead of leg 108, for example, to attach the compression device 100 to the backboard 3300. Further, leg 3400 is just one example of many type of legs that may be used with the backboard 3300. The leg 3400 can include two opposing spring-loaded shafts 3402. Springs (not shown) can be attached to the shafts 3402 and a release ring 3404. When pulling upward on the release ring 3404, the shafts 3402 are retracted into the leg 3400 to allow the leg 3400 to enter the opening 3302.

The spring-loaded shafts 3402 are provided on an end 3406 of the leg 3400 that is structured to fit within the opening 3302. The portion of the leg 3400 above the end 3406 is wider than the opening 3322 so that only the end 3406 can fit within the opening 3302. The shafts 3402 extend beyond the end 3406 such that the end 3406 would not fit within the opening 3302 unless the shafts 3402 are retracted. This prevents the leg 3400 from disconnecting from the backboard 3300 during use of the compression device.

Figure 35:
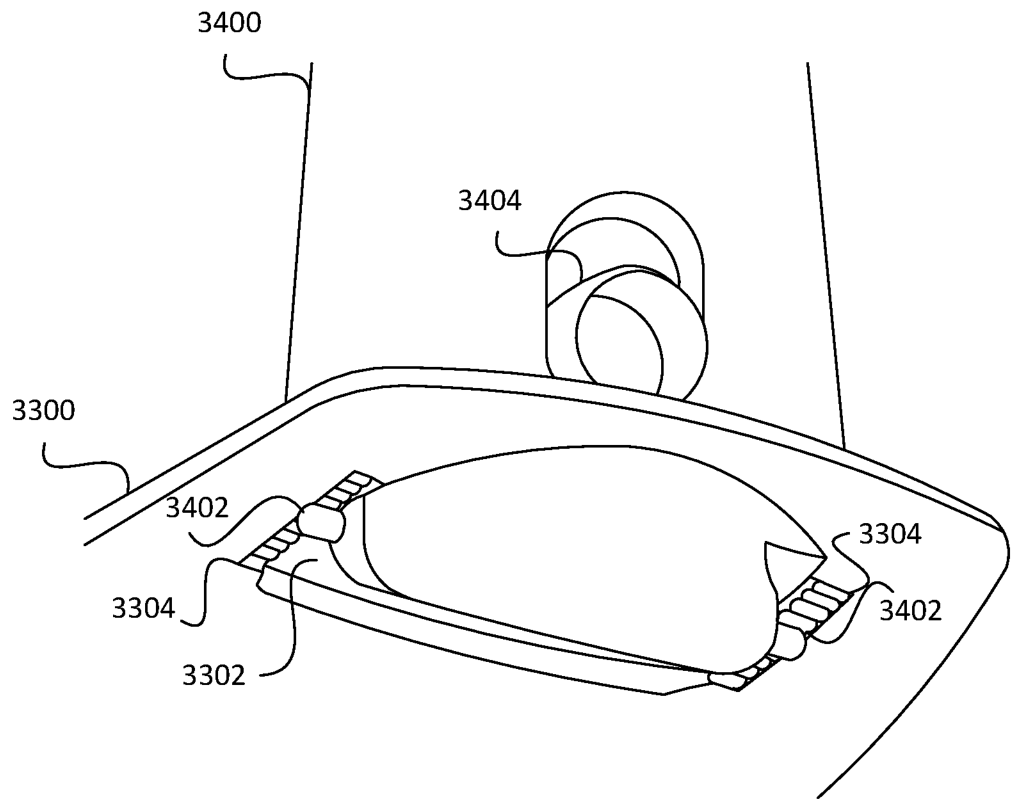
FIG. 35 is a cross-section view of the leg of FIG. 34 attached to the backboard of FIG. 33.

FIG. 35 illustrates a bottom perspective view of the leg 3400 attached to the backboard 3320 according to some examples of the disclosure. The release ring 3404 is lifted or pulled to retract the shafts 3402 into the leg so the leg can be inserted into the opening 3322. As can be seen in FIG. 35, the lower portion of the leg 3400 is structured to be just wide enough to fit within the opening 3302. Once the leg 3400 is placed in the opening, the ring 3404 can be released and the shafts 3402 can be protrude to engage with the grooves 3304 of the backboard 3300. The leg 3400 is now connected to the backboard 3320 and cannot be removed without pulling the release ring 3404 to retract the shafts 3402.

If grooves 3304 are provided, then the legs 3400 can move along the grooves 3304 within the opening 3302 until at a desired position. The legs 3400 can be locked to a particular groove 3304 using any locking means, such as an activator. Alternatively, the grooves 3304 may be deep enough that the legs must be positioned at their desired location with the shafts 3402 retracted, and then once the shaft 3402 is within a particular groove or protrusion, the leg 3400 is immobile. The opening 3302, grooves 3304, and shafts 3402 all work in conjunction to allow the legs 3400 to laterally slide relative to the backboard 3300 to accommodate different patient widths and chest heights and to set the legs at the most desirable location for the compression device and the patient.

The edges of the legs 3400 around the shafts 3402 may be a replaceable rubber part that can seal the shaft bearings from intakes of liquid or dust during use or cleaning of the legs 3400.

Additionally or alternatively to the example backboards discussed above, in some examples, cushions or support from a carrying case for the compression device may be used to laterally support a patient on the backboard. The cushions may be used with any of the above discussed backboards, or with a backboard that is not adjustable, such as backboard 110 discussed above.

Figure 36:
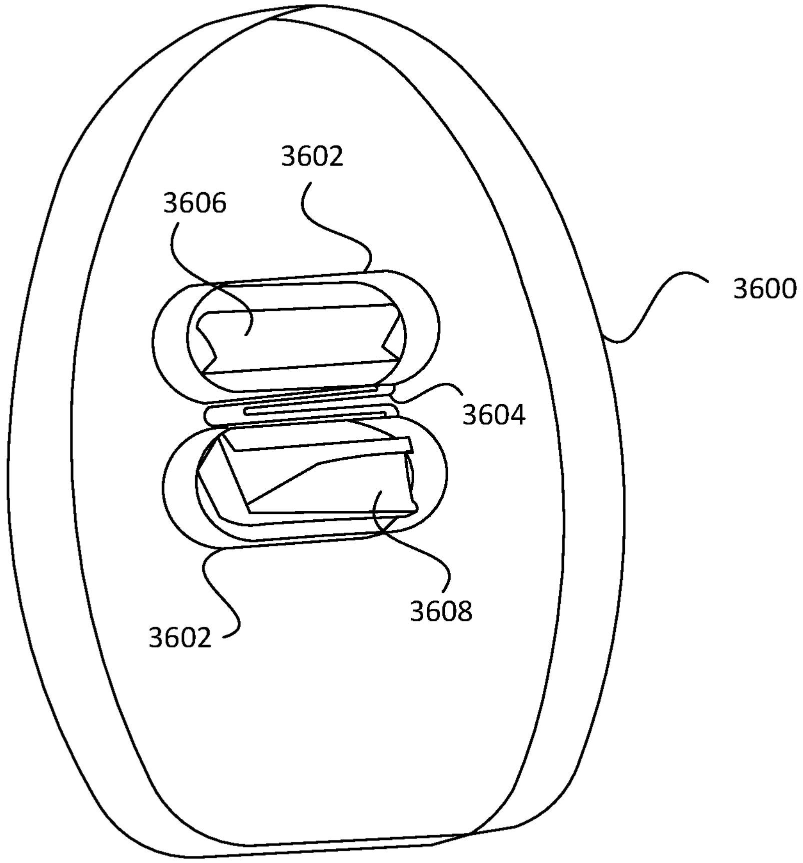
FIG. 36 is a perspective view of a carrying case with cushions according to some examples of the disclosure.

FIG. 36 illustrates an example of an open carrying case 3600 for a chest compression unit. The carrying case 3600 may include cushions 3602 for carrying components of the compression unit, such as a suction cup 3606 and/or a spare battery 3608. The cushions 3602 may be connected by an elongated flexible portions 3604 that can be folded, as seen in FIG. 36. The cushions 3602 may be made of any suitable semi-stiff material, such as plastic, silicone, or foam, that can return to its original shape after use with a patient. For example, a patient may be wider than the elongated portion 3604 and may lay on the edges of the cushions 3602 in some situations. The cushions 3602 can be hollow or may have a bottom portion that can provide rigidity.

Figure 37:
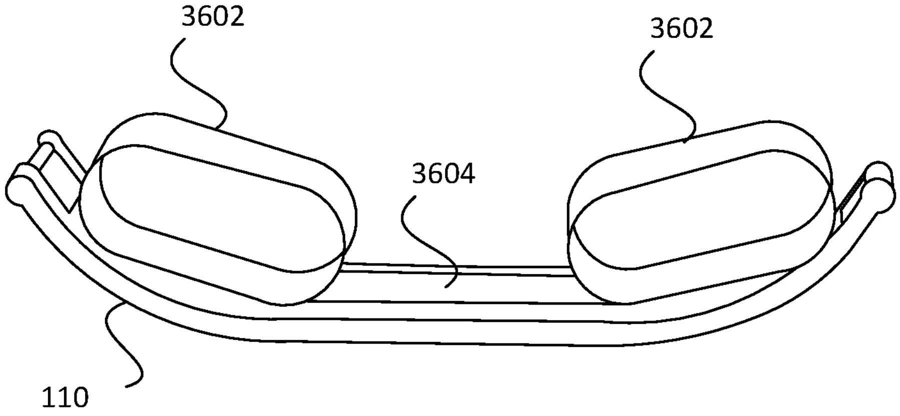
FIG. 37 is a perspective view of the cushions of FIG. 36 on a backboard according to some examples of the disclosure.

During use of the compression device, the cushions 3602, connected by the elongated portion 3610, can be removed from the carrying case 3600 and placed on a backboard 110, as shown in FIG. 37. The cushions 3602 can provide lateral support to a smaller patient to prevent the patient from sliding. Even if a patient is laying on or compressing the edges of the cushions 3602, the cushions 3602 can still prevent the patient from sliding laterally relative to the backboard and can help ensure adequate positioning of the piston 116. In configurations, the suction cup 3604 may be used as a support, for example, when positioned as illustrated in FIG. 37.

The cushions 3602 and elongated portion 3610 may include a non-slip material and be placed directly on the backboard 110, or the cushions 3602 may attach to the backboard and/or legs 108 via straps, hook and loop fasteners, hooks, or any other means, to help prevent the patient and cushions from sliding during use of the compression device.

In some examples, the elongated portion 3610 may be stiff or generally inflexible. In such examples, the cushions may fold relative to the elongated portion 3610 so that the cushions 3602 rest on top of the elongated portion when in the carrying case 3600 or may be folded out during use on the backboard 110 with the elongated portions 3610 spanning between the two cushions 3602.

In another example, the cushions 3602 may attach to a protrusion (not shown) within the carrying case by a holder, as shown in FIG. 36, which may be the same width and thickness as a leg 108 of the compression device 100. The holder can attach to the leg 108 of the compression device to provide lateral support for a patient.

Figure 38:
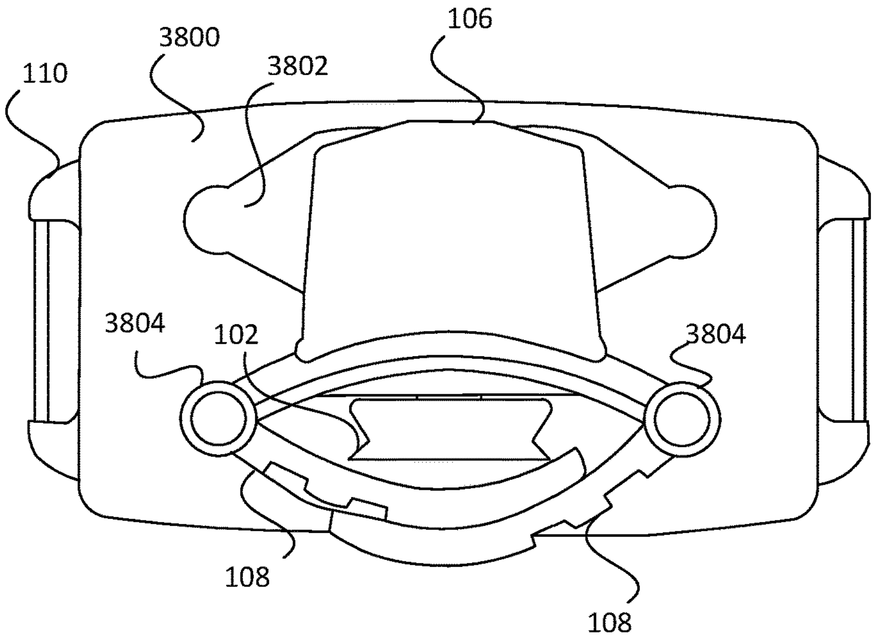
FIG. 38 is a top view of a backboard with a cushion to support a chest compression device according to some examples of the disclosure.

As another example of a carrying case cushion, FIG. 38 illustrates a cushion 3800 that is the general shape of the backboard 110. The cushion 3800 in FIG. 38 is illustrated as slightly larger than the backboard, but could also be slightly smaller than the backboard in some examples. In configurations, the cushion may be, for example, inflatable, allowing the user to inflate the cushion to a higher or lower level to accommodate the patient's size. During transport of the chest compression device 100, the cushion 3800 can be placed on top of the backboard 110 and have an opening or other cut-out 3802 to accommodate the upper portion of the chest compression device 100, including the support structure 104 and the central unit 106. For example, the legs 108 may be folded by hinges 3804 relative to the central unit 106 and the support structure 104. The compression device 100 may be placed within the opening 3802 of the cushion with the folded legs 108. The backboard 110, cushion 3800, and chest compression device 100 can then be placed inside a carrying case.

Figure 39:
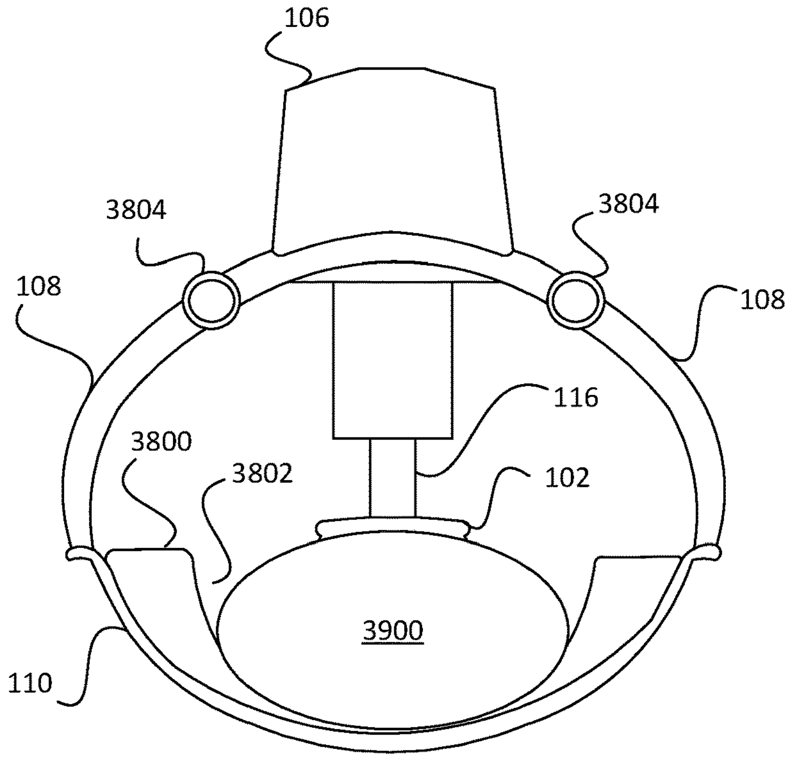
FIG. 39 is a front view of a chest compression device with the cushion of FIG. 38 used as lateral support.

During operation of the chest compression device 100, as shown in FIG. 39, the cushion 3800 can remain on the upper surface of the backboard 110 and a smaller patient 3900 can be placed within the opening 3802 to provide lateral support during compressions. The cushion may be made of anti-slip material or may include a fastener, such as, but not limited to, a strap, hook and loop fastener, clips, etc., to attach the cushion to the backboard 110 and/or the legs 108. The cushion 3800 may be positioned differently than what is illustrated.

Figure 40:
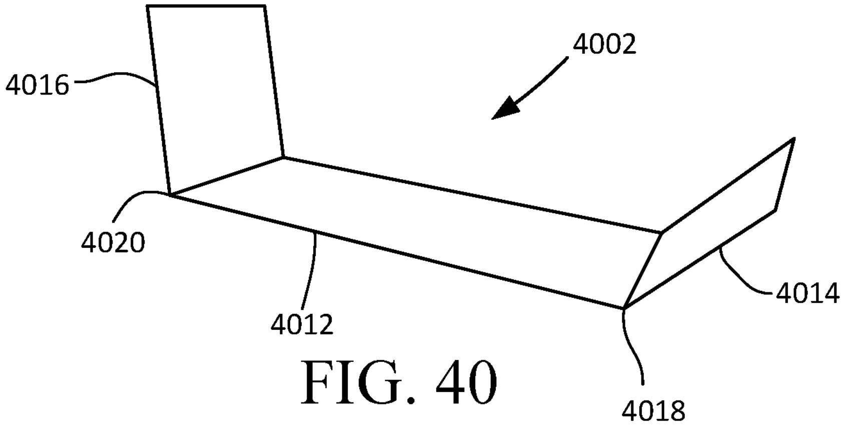
FIG. 40 is a perspective view of a supportive structure, according to examples in the disclosure.

FIG. 40 is a perspective view of a supportive structure 4002, according to examples in the disclosure. As illustrated in FIG. 40, the supportive structure 4002 may include a middle section 4012, a first lateral section 4014 on a first end of the middle section 4012, and a second lateral section 4016 on a second end of the middle section 4012. Each of the middle section 4012, the first lateral section 4014, and the second lateral section 4016 are substantially rigid. As used in this context, "substantially rigid" means largely or essentially stiff and not pliant, without requiring perfect inflexibility. A first junction 4018 between the middle section 4012 and the first lateral section 4014 is flexible to permit the first lateral section 4014 to pivot relative to the middle section 4012. A second junction 4020 between the middle section 4012 and the second lateral section 4016 is flexible to permit the second lateral section 4016 to pivot relative to the middle section 4012.

Figure 41A:
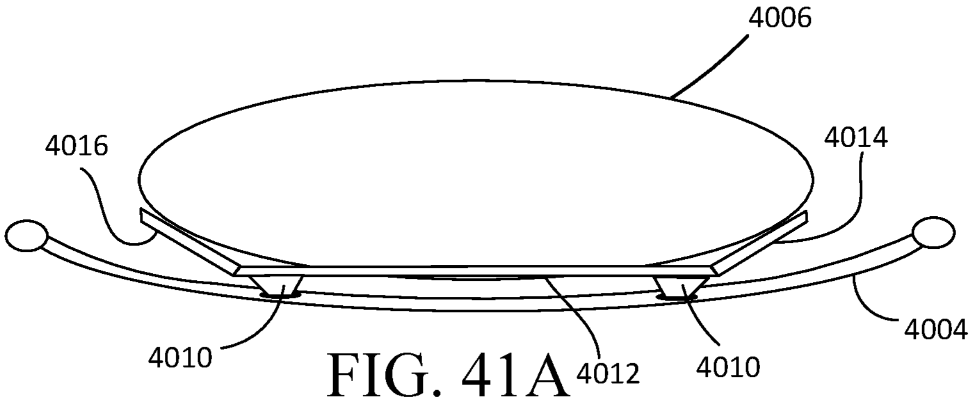
FIGS. 41A-41C are front views of the supportive structure of FIG. 40 on a backboard, according to examples in the disclosure.
Figure 41B:
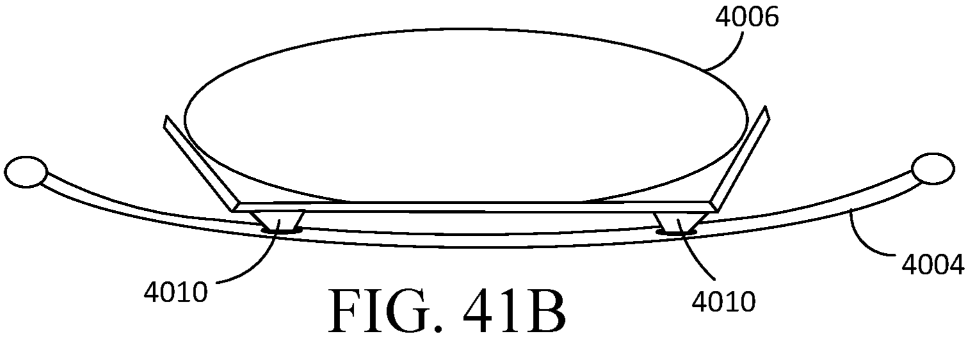
Figure 41C:
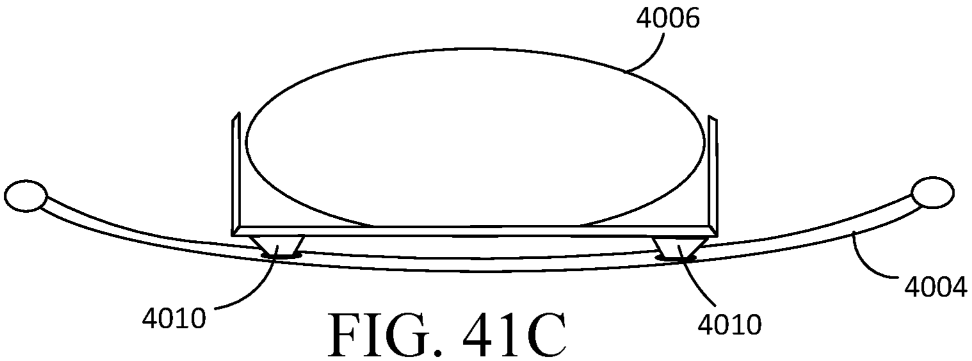
Figure 42:
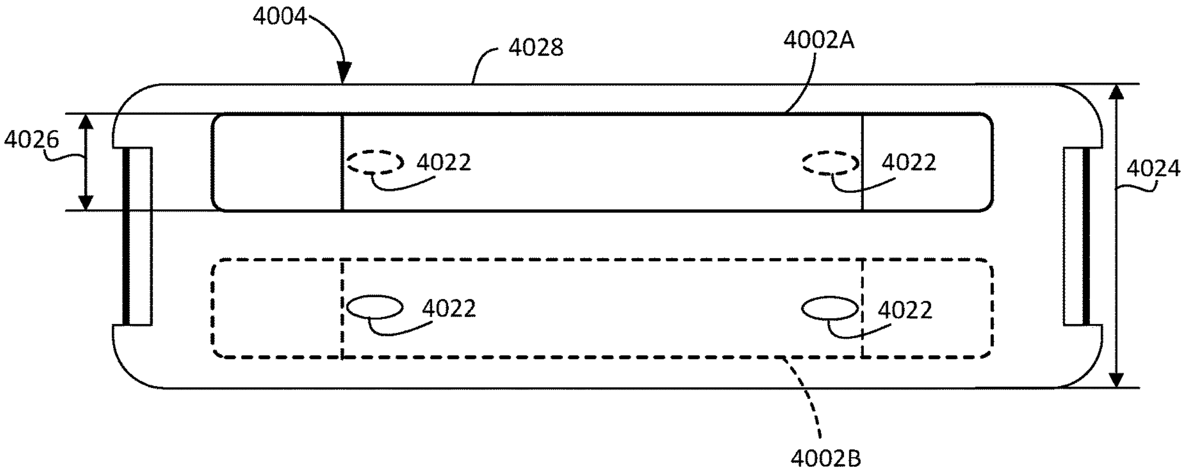
FIG. 42 is a top view of the supportive structure and backboard of FIG. 41A, but without showing the patient.

FIGS. 41A-41C are front views of the supportive structure 4002 of FIG. 40 on a backboard 4004, according to examples in the disclosure. FIGS. 41A-41C illustrate the lateral sections of the supportive structure 4002 in three different positions. FIG. 42 is a top view of the supportive structure 4002 and backboard 4004 of FIG. 41A, but without showing the patient 4006.

As illustrated in FIGS. 41A-42, the backboard 4004 includes an elongated portion 4028 that extends along a longitudinal axis. The longitudinal axis runs left to right from the viewpoint illustrated in FIG. 42. The elongated portion 4028 has a first distal end and a second distal end. There are a plurality of apertures 4022 within the elongated portion 4028. The elongated portion 4028 and the plurality of apertures may be, for example, the backboard 2100 and apertures 2104 depicted in FIG. 21 and described above for that drawing. The supportive structure 4002 has at least two protrusions 4010 that are structured to be received in the plurality of apertures 4022.

The supportive structure 4002 having a longitudinal axis, which runs left to right from the viewpoint illustrated in FIG. 42. The longitudinal axis of the supportive structure 4002 is substantially parallel to the axis of the elongated portion 4028. As used in this context, "substantially parallel" means largely or essentially equidistant at all points, without requiring perfect parallelism. The supportive structure 4002 is configured to support a patient 4006 above the elongated portion 4028. Accordingly, the supportive structure 4002 may be particularly useful for smaller patient 4006*s*, including children by, for example, positioning the patient 4006 closer to the chest compression mechanism when the supportive structure 4002 is used with a mechanical CPR device.

As best illustrated in FIG. 42, the elongated portion 4028 has a width 4024, the width being substantially perpendicular to the axis of the elongated portion 4028, in which the supportive structure 4002 has a width 4026. As used in this context, "substantially perpendicular" means largely or essentially at right angles, without requiring perfect perpendicularity. In configurations, the width 4026 of the supportive structure 4002 half or less the width 4024 of the elongated portion 4028 so that the supportive structure 4002 may be positioned in different locations on the elongated portion 4028, such as the positions labeled 4002A and 4002B in FIG. 42.

Any of the configurations discussed above or illustrated in any of the drawings may include one or more straps connected to the backboard. The straps may assist to secure the patient, particularly a small patient such as a child, to the backboard and to help properly position the patient on the backboard. The straps may be adjustable, both in terms of length and the attachment position on the backboard. The straps may be configured to secure any or all of the patient's head, torso, arms, or wrists. In configurations, the straps may be attached instead or also to the legs 108 of the CPR device 100. Additional fixation or positioning methods or features may also be used.

Instead of or in addition to any of the configurations discussed above, a high-friction rubber bag containing a material that makes the bag shape change may be used between the patient and the back plate to help properly position the patient. The material in the sealed, high-friction rubber bag may be, for example, flour or other materials with similar function, meaning the material in the bag may be adjusted, or moved, to adapt to the patient's size and shape.

EXAMPLES

Illustrative examples of the disclosed technologies are provided below. A particular configuration of the technologies may include one or more, and any combination of, the examples described below.

Example 1 includes an adjustable size backboard for a chest compressions device, comprising: a first connector structured to attach to a first leg of a chest compression device; a second connector structured to attach to a second leg of the chest compression device; and an adjustable elongated portion extending along a longitudinal axis between the first connector and the second connector, the adjustable elongated portion having a variable distance between the first connector and the second connector along the longitudinal axis.

Example 2 includes the adjustable size backboard of Example 1, wherein the adjustable elongated portion includes a first portion extending from the first connector and a second portion extending from the second connector, the second portion structured to slide within the first portion along the longitudinal axis.

Example 3 includes the adjustable size backboard of any of Examples 1-2, wherein the adjustable elongated portion includes a first portion extending from the first connector, a second portion extending from the second connector, and two portions extending along the longitudinal axis between the first portion and the second portion.

Example 4 includes the adjustable size backboard of Example 3, wherein each portion is attached to an adjacent portion by a hinge and the adjustable elongated portion is folded along at least one of the hinges to vary the distance between the first connector and the second connector along the longitudinal axis.

Example 5 includes the adjustable size backboard of any of Examples 1-4, wherein the adjustable elongated portion includes multiple portions that are releasably connected to vary the distance along the longitudinal axis between the first connector and the second connector.

Example 6 includes a foldable backboard for a chest compression device, comprising: a first connector structured to attach to a first leg of a chest compression device; a second connector structured to attach to a second leg of the chest compression device; and an elongated portion extending between the first connector and the second connector, the elongated portion including at least two portions connected to each other by a hinge pivotable about an axis parallel to the first connector and the second connector.

Example 7 includes the foldable backboard of Example 6, wherein one of the at least two portions can be folded over the other portion by the hinge.

Example 8 includes the foldable backboard of Example 6, wherein the elongated portion includes four portions, each portion connected to at least one other portion by a hinge rotatable about a respective axis parallel to the first connector and the second connector.

Example 9 includes the foldable backboard of Example 8, wherein each of the four portions includes at least one connector structured to attach to one of the first leg or the second leg of the chest compression device.

Example 10 includes the foldable backboard Example 6, wherein the elongated portion includes a first portion extending from the first connector, a second portion extending from the second connector, and a third portion extending between the first connector and the second connector, each portion attached to an adjacent portion by a hinge rotatable about an axis parallel to the first connector.

Example 11 includes the foldable backboard of Example 10, wherein the third portion further includes a third connector structured to attach to one of the first leg or the second leg of the chest compression device.

Example 12 includes a backboard for a chest compression device, comprising: a first side structured to accommodate an adult-sized patient at a first distance from a surface when attached to the chest compression device in a first orientation; and a second side structured to accommodate a pediatric-sized patient at a second distance from the surface, the second distance being greater than the first distance, when attached to the chest compression device in a second orientation.

Example 13 includes the backboard of Example 12, wherein the first side includes two attachment points, each attachment point structured to attach a respective leg of the chest compression device to the backboard when in the first orientation, and wherein the second first side includes two attachment points, each attachment point structured to attach a respective leg of the chest compression device to the backboard when in the second orientation.

Example 14 includes the backboard of any of Examples 12-13, wherein the first side has a first curvature and the second side has a second curvature different from the first curvature.

Example 15 includes the backboard of Example 12, wherein the backboard is wedge-shaped.

Example 16 includes the backboard of any of Examples 12-15, further comprising a retractable headrest.

Example 17 includes the backboard of Example 12, wherein the first side is concave and the second side includes a flat section to accommodate the pediatric-sized patient.

Example 18 includes the backboard of any of Examples 12-17, further comprising an identifier configured to identify the backboard to the chest compression device.

Example 19 includes a chest compression device, comprising: a chest compression member; the backboard of any of Examples 12-18; and a controller configured to determine an identification of the backboard and adjust the chest compression member based on the identification.

Example 20 includes the chest compression device of Example 19, wherein the backboard includes a first identification component identifying the first orientation associated with the first side of the backboard and a second identification component identifying the second orientation associated with the backboard, and the controller is configured to received one of the first orientation or the second orientation from the backboard and control the chest compression member based on the received orientation.

Example 21 includes the chest compression device of Example 20, wherein the first identification component is located in a first connector associated with the first side of the backboard, the first connector configured to attach to a leg of the chest compression device when the backboard is the first orientation, and wherein the second identification component is located in a second connector associated with the second side of the backboard, the second connector configured to attach to the leg of the chest compression device when the backboard is in the second orientation.

Example 22 includes the chest compression device of any of Examples 19-21, wherein the controller is configured to determine the identification of the backboard based on a characteristic of a first connector or a second connector.

Example 23 includes the chest compression device of Example 22, wherein the characteristic includes at least one of an angle of a leg of the chest compression device connected to a respective connector of the backboard or a size of an anchoring point of the respective connector.

Example 24 includes an adjustable backboard for a compressions device, comprising an elongated portion extending along a longitudinal axis; a first connector coupled to a first distal end of the elongated portion by a first shaft that is perpendicular to the longitudinal axis, the first connector structured to pivot about the first shaft; and a second connector coupled to a second distal end of the elongated portion by a second shaft that is perpendicular to the longitudinal axis, the second connector structured to pivot about the second shaft.

Example 25 includes the adjustable backboard of Example 24, wherein the first connector pivots about the first shaft to at least two positions structured to attach a leg of the compression device, and wherein the second connector pivots about the second shaft to at least two positions structured to attach to another leg of the compression device.

Example 26 includes the adjustable backboard of Example 25, wherein the at least two positions include a first position that is higher than a second position.

Example 27 includes an adjustable backboard for a compressions device, comprising: a first connector having a protrusion; a second connector having a protrusion; and an elongated portion including a first distal end having a plurality of recesses, the first connector structured to releasably attach to one of the recesses of the first distal end, and a second distal end having a plurality of recesses, the second connector structured to releasably attach to one of the recess of the second distal end.

Example 28 includes the adjustable backboard of Example 27, wherein the plurality of recesses include a first recess higher than a second recess.

Example 29 includes the adjustable backboard of any of Examples 27-28, wherein the first connector includes a locking mechanism structured to secure the first connector to one of the recess of the first distal end.

Example 30 includes the adjustable backboard of Example 29, wherein the first connector further includes an engagement mechanism structured to engage the locking the mechanism.

Example 31 includes an adjustable backboard for a compression device, comprising: an elongated portion extending along a longitudinal axis, the elongated portion having a first distal end and a second distal end; a first stationary connector located at the first distal end of the elongated portion; a first adjustable length connector located at the first distal end of the elongated portion; a second stationary connector located at the first distal end of the elongated portion; and a second adjustable length connector located at the first distal end of the elongated portion.

Example 32 includes the adjustable backboard of any of Examples 31, wherein the first adjustable length connector and the second adjustable length connector are structured to attach to a leg of the compression device only when extended.

Example 33 includes a backboard for a compression device, comprising: an elongated portion extending along a longitudinal axis, the elongated portion having a first distal end and a second distal end; a plurality of apertures within the elongated portion; and two removable stabilizing members, each stabilizing member having at least one protrusion structured to be received in one of the plurality of apertures.

Example 34 includes the backboard of Example 33, further comprising a holder within the elongated portion structured to store one of the stabilizing members.

Example 35 includes the backboard of any of Examples 33-34, wherein a portion of the plurality of apertures are provided near the first distal end and a remaining portion of apertures are provided near the second distal end.

Example 36 includes the backboard of Example 35, wherein safety markers are printed on the elongated portion above each aperture of the portion of the plurality of apertures and each aperture of the remaining portion of apertures.

Example 37 includes a backboard for a compression device, comprising: an elongated portion extending along a longitudinal axis, the elongated portion having a first end, a second end, and a patient receiving portion between the first end and the second end; a first set of stabilizing members on the first end of the elongated portion, each of the first set of stabilizing members rotatably connected to the elongated portion; and a second set of stabilizing members on the second end of the elongated portion, each of the second set of stabilizing members rotatably connected to the elongated portion.

Example 38 includes the backboard of Example 37, further comprising a locking mechanism for each stabilizing member of the first set of stabilizing members and the second set of stabilizing members, the locking mechanism structured to lock the stabilizing member generally perpendicular to the longitudinal axis.

Example 39 includes the backboard of any of Examples 37-38, wherein each of the stabilizing members includes a handle.

Example 40 includes a backboard for a compression device, comprising: an elongated portion extending along a longitudinal axis; a first opening defined by a first distal end of the elongated portion, the first opening structured to receive a first leg of the chest compression device; a plurality of projections on two sides of the first opening, each of the projections structured to attach to a first leg of the compression device; a second opening defined by a second distal end of the elongated portion, the second opening structured to receive a second leg of the chest compression device; and a plurality of projections on two sides of the first opening, each of the projections structured to attach to a first leg of the compression device.

Example 41 includes the backboard of Example 40, wherein the first opening is defined by two projections of elongated board at the first distal end and the second opening is defined by two projections of the elongated board at the second distal end.

Example 42 includes the backboard of any of Examples 40-41, wherein the projections include a plurality of grooves.

Example 43 includes a chest compression system, comprising: the backboard of any of Examples 40-42; a chest compression device including: a central unit, and two legs attached to the central unit, each leg including a spring-loaded shaft structured to be received by the plurality of projections.

Example 44 includes the chest compression system of Example 43, wherein each leg includes a release ring to retract the spring-loaded shaft into an interior of the leg.

Example 45 includes a backboard for a compression device, comprising: an elongated portion extending along a longitudinal axis, the elongated portion having a first distal end and a second distal end; a plurality of apertures within the elongated portion; and a supportive structure having at least two protrusions structured to be received in the plurality of apertures, the supportive structure having a longitudinal axis that is substantially parallel to the axis of the elongated portion, the supportive structure configured to support a patient above the elongated portion.

Example 46 includes the backboard of Example 45, in which the supportive structure comprises a middle section, a first lateral section on a first end of the middle section, and a second lateral section on a second end of the middle section, each of the middle section, the first lateral section, and the second lateral section being substantially rigid, a first junction between the middle section and the first lateral section being flexible to permit the first lateral section to be pivoted relative to the middle section, and a second junction between the middle section and the second lateral section being flexible to permit the second lateral section to be pivoted relative to the middle section.

Example 47 includes the backboard of any of Examples 45-46, in which the elongated portion has a width, the width being substantially perpendicular to the axis of the elongated portion, in which the supportive structure has a width, the width of the supportive structure being half or less the width of the elongated portion.

For purposes of this description, certain aspects, advantages, and novel features of the examples of this disclosure are described herein. Features, integers, characteristics, compounds, chemical moieties or groups described in conjunction with a particular aspect, configuration, or example of the disclosure are to be understood to be applicable to any other aspect, configuration or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The disclosure is not restricted to the details of any foregoing examples. The disclosure extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms “a”, “an”, and “at least one” encompass one or more of the specified element. That is, if two of a particular element are present, one of these elements is also present and thus “an” element is present. The terms “a plurality of” and “plural” mean two or more of the specified element. “Generally” or “approximately” as used herein means a variance of 10%.

As used herein, the term “and/or” used between the last two of a list of elements means any one or more of the listed elements. For example, the phrase “A, B, and/or C” means “A,” “B,” “C,” “A and B,” “A and C,” “B and C,” or “A, B, and C.”

As used herein, the term “coupled” generally means physically coupled or linked and does not exclude the presence of intermediate elements between the coupled items absent specific contrary language.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the disclosure have been illustrated and described for purposes of illustration, it will be understood that various modifications may be made without departing from the spirit and scope of the disclosure.

We claim:

1. A backboard for a chest compression device, the backboard comprising:

a chest compression member;

a backboard configured to interface with a support surface, the backboard comprising:

a first side structured to accommodate an adult-sized patient at a first distance from a support surface when attached to the chest compression device in a first orientation; and a second side structured to accommodate a pediatric-sized patient at a second distance from the support surface when attached to the chest compression device in a second orientation, the second distance being greater than the first distance;

wherein the first side and the second side are separate, unitary structures, and wherein the first orientation corresponds to the second side interfacing with the support surface, and the second orientation correspond to the first side interfacing with the support surface; and a controller configured to determine an identification of the backboard and adjust the chest compression member based on the identification, wherein the controller is configured to determine the identification of the backboard based on a characteristic of a first connector or a second connector.

2. The chest compression device of claim 1, wherein the characteristic includes at least one of an angle of a leg of the chest compression device connected to a respective connector of the backboard or a size of an anchoring point of the respective connector.

3. The chest compression device of claim 1, in which the first side of the backboard includes a first attachment point and a second attachment point, and in which the second side of the backboard includes a first attachment point and a second attachment point, wherein the first attachment point of the first side is structured to attach a first leg of the chest compression device to the backboard when in the first orientation, wherein the second attachment point of the first side is structured to attach a second leg of the chest compression device to the backboard when in the first orientation, wherein the first attachment point of the second side is structured to attach the first leg of the chest compression device to the backboard when in the second orientation, wherein the second attachment point of the second side is structured to attach the second leg of the chest compression device to the backboard when in the second orientation.

4. The chest compression device of claim 1, wherein the second side of the backboard is configured to support the first side of the backboard at the first distance from the support surface when the first side is attached to the chest compression device in the first orientation, and wherein the first side is configured to support the second side at the second distance from the support surface when the second side is attached to the chest compression device in the second orientation.

5. The chest compression device of claim 1, wherein the first side of the backboard has a curved portion with a first radius of curvature, and the second side of the backboard has a curved portion with a second radius of curvature that is different from the first radius of curvature.

6. The chest compression device of claim 1, wherein the backboard is wedge-shaped, in which the first side has a first incline at a first inclination angle and the second side has a second incline at a second inclination angle, the second inclination angle being greater than the first inclination angle.

7. The chest compression device of claim 1, wherein the first side is concave and the second side includes a flat section to accommodate the pediatric-sized patient.

8. A chest compression device, comprising:

a chest compression member;

a backboard configured to interface with a support surface, the backboard comprising:

a first side structured to accommodate an adult-sized patient at a first distance from a support surface when attached to the chest compression device in a first orientation, and a second side structured to accommodate a pediatric-sized patient at a second distance from the support surface when attached to the chest compression device in a second orientation, the second distance being greater than the first distance;

wherein the first side and the second side are separate, unitary structures, and wherein the first orientation corresponds to the second side interfacing with the support surface, and the second orientation correspond to the first side interfacing with the support surface; and a controller configured to determine an identification of the backboard and adjust the chest compression member based on the identification, wherein the backboard includes a first identification component identifying the first orientation associated with the first side of the backboard and a second identification component identifying the second orientation associated with the backboard, and the controller is configured to received one of the first orientation or the second orientation from the backboard and control the chest compression member based on the received orientation, wherein the first identification component is located in a first connector associated with the first side of the backboard, the first connector configured to attach to a leg of the chest compression device when the backboard is the first orientation, and wherein the second identification component is located in a second connector associated with the second side of the backboard, the second connector configured to attach to the leg of the chest compression device when the backboard is in the second orientation.

9. The chest compression device of claim 8, in which the first side of the backboard includes a first attachment point and a second attachment point, and in which the second side of the backboard includes a first attachment point and a second attachment point, wherein the first attachment point of the first side is structured to attach a first leg of the chest compression device to the backboard when in the first orientation, wherein the second attachment point of the first side is structured to attach a second leg of the chest compression device to the backboard when in the first orientation, wherein the first attachment point of the second side is structured to attach the first leg of the chest compression device to the backboard when in the second orientation, wherein the second attachment point of the second side is structured to attach the second leg of the chest compression device to the backboard when in the second orientation.

10. The chest compression device of claim 8, wherein the second side of the backboard is configured to support the first side of the backboard at the first distance from the support surface when the first side is attached to the chest compression device in the first orientation, and wherein the first side is configured to support the second side at the second distance from the support surface when the second side is attached to the chest compression device in the second orientation.

11. The chest compression device of claim 8, wherein the first side of the backboard has a curved portion with a first radius of curvature, and the second side of the backboard has a curved portion with a second radius of curvature that is different from the first radius of curvature.

12. The chest compression device of claim 8, wherein the backboard is wedge-shaped, in which the first side has a first incline at a first inclination angle and the second side has a second incline at a second inclination angle, the second inclination angle being greater than the first inclination angle.

13. The chest compression device of claim 8, wherein the first side is concave and the second side includes a flat section to accommodate the pediatric-sized patient.

* * * * *